US010903771B2

(12) United States Patent
Parsapour et al.

(10) Patent No.: US 10,903,771 B2
(45) Date of Patent: Jan. 26, 2021

(54) SYSTEM, APPARATUS AND METHOD FOR HIGH TORQUE DENSITY PERMANENT MAGNET SWITCHED RELUCTANCE MACHINE

(71) Applicant: Board of Regents, The University of Texas System, Austin, TX (US)

(72) Inventors: Amir Parsapour, Richardson, TX (US); Mehdi Moallem, Plano, TX (US); Babak Fahimi, Plano, TX (US)

(73) Assignee: Board of Regente, The University of Texas System, Austin, TX (US)

( * ) Notice: Subject to any disclaimer, the term of this patent is extended or adjusted under 35 U.S.C. 154(b) by 0 days.

(21) Appl. No.: 16/352,679

(22) Filed: Mar. 13, 2019

(65) Prior Publication Data
US 2019/0288627 A1    Sep. 19, 2019

Related U.S. Application Data

(60) Provisional application No. 62/642,474, filed on Mar. 13, 2018.

(51) Int. Cl.
*H02P 25/098*    (2016.01)
*H02K 1/12*    (2006.01)
*H02K 41/03*    (2006.01)

(52) U.S. Cl.
CPC .................................. *H02P 25/098* (2016.02)

(58) Field of Classification Search
CPC ....... H02P 25/098; H02K 1/12; H02K 41/031
See application file for complete search history.

(56) References Cited

U.S. PATENT DOCUMENTS

| | | | | |
|---|---|---|---|---|
| 2003/0107342 A1* | 6/2003 | Gallegos-Lopez | ....... | H02P 9/40 318/701 |
| 2008/0129243 A1* | 6/2008 | Nashiki | .................. | H02K 1/246 318/701 |
| 2010/0123426 A1* | 5/2010 | Nashiki | .................... | H02K 1/12 318/701 |
| 2015/0295456 A1* | 10/2015 | Michaelides | .......... | H02K 21/16 310/156.01 |

* cited by examiner

*Primary Examiner* — Cortez M Cook
(74) *Attorney, Agent, or Firm* — Schultz & Associates, P.C.

(57) ABSTRACT

A high torque density permanent magnet switched reluctance apparatus with a structure similar to a switched reluctance motor. The apparatus has an inner stator having a plurality of poles, and a rotor disposed radially outward of the inner stator and having a plurality of segments serving as poles. A respective winding is disposed between every pair of adjacent poles of the stator. The apparatus operates with a plurality of separately excitable phases, a given phase being excited by energizing the windings corresponding to the given phase. Excitation of a given phase causes induction of magnetic fluxes traversing a region substantially confined to the region of the stators and rotor segments corresponding to the given phase, and causes a substantial amount of flux to enter rotor segments not in the radial direction but perpendicular to the radial direction.

8 Claims, 21 Drawing Sheets

(PHASE A)

(PHASE A)

(PHASE A)

(PHASE A)

(PHASE A)

(PHASE A)

(PHASE A)

(PHASE B)

(PHASE B)

(PHASE B)

(PHASE C)

(PHASE C)

(PHASE C)

(THREE PHASES COMBINED)

SYSTEM, APPARATUS AND METHOD FOR HIGH TORQUE DENSITY PERMANENT MAGNET SWITCHED RELUCTANCE MACHINE

CROSS REFERENCE TO RELATED APPLICATION

This application claims the benefit of U.S. Provisional Patent Application No. 62/642,474 filed on Mar. 13, 2018. Each patent application identified above is incorporated herein by reference in its entirety to provide continuity of disclosure.

BACKGROUND

Conventional switched reluctance machines feature a rugged structure, robust performance in harsh ambient conditions, and low manufacturing cost. However, the majority of the electromagnetic forces generated by a conventional switched reluctance machine does not contribute to useful work, and a significant proportion of these forces generates undesirable vibrations that have been identified as a major drawback for such machines. Thus, limited torque density and energy conversion efficiency, among other characteristics, of conventional switched reluctance machines has limited their industrial applicability. Accordingly, there is a need for switched reluctance machines in which a higher proportion of the electromagnetic forces generated contributes to torque. The conventional design suffers from a low maximum torque density, low torque to weight ratio, and high torque ripple.

Two challenges faced by conventional interior permanent magnet machines with full pitch winding is that they have high copper losses and they are fault intolerant. Copper losses arise because the current flowed in the windings encounters an electrical resistance from the copper wires, which is proportional to the length of winding. Hence, using shorter winding reduces copper losses. Therefore, there is a need in the prior art for designs which reduce copper losses while maintaining the level of mechanical rotation that is available for work. Using concentrated windings instead of full pitch windings and decoupled phases leads to fault tolerant design. The following table shows the third generation Toyota Prius interior permanent magnet motor specifications.

Conventional switched reluctance machines suffer from torque ripple. Torque ripple refers to the variance in the strength of the magnetic interaction as the rotor completes a full rotation. In conventional designs, a single full rotation of the rotor will involve several such dips in torque output. The resulting oscillation in the amount of available torque is the "torque ripple."

A conventional design includes the following characteristics:

| | Interior Permanent Magnet Machine |
|---|---|
| Active Diameter (mm) | 264 |
| Active length (mm) | 108 |
| Stack length (mm) | 50 |
| Winding type | Full pitch |
| Slot fill factor | 56% |
| Number of stator slot | 48 |
| Number of rotor pole pair | 8 |
| Iron weight (Kg) | 16.3 |
| Copper Weight (Kg) | 4.93 |

-continued

| | Interior Permanent Magnet Machine |
|---|---|
| Magnet Weight (kg) | 0.768 |
| Peak torque (N · m) at 20 (A/mm$^2$) | 207 |
| Maximum torque density (N.m/L) | 35 |
| Torque weight ratio (N · m/Kg) | 9.3 |

SUMMARY OF THE INVENTION

The present invention relates to a permanent magnet switched reluctance machine. In a preferred embodiment, the machine provides a central E-core stator with a rotor that is disposed radially outward from the stator.

The stator is an E-core stator, having a plurality of poles around which copper windings are positioned. The design of the stator allows for shorter windings than full pitch windings, which results in lower overall copper losses. The windings are divided into three phases, A-C.

The permanent magnets in the rotor are attracted and repelled by the magnetic fields generated by the windings, and push and pull the rotor around the stator. The permanent magnets have a number of ellipsoidal faces, allowing magnets with repelling polarities to be positioned near each other on the rotor. The repelling pairs of magnets produce strong magnetic fields that are biased radially inward towards the stator poles, allowing the electromagnetic fields from the stator windings to move the rotor.

The present invention utilizes a set of permanent magnets in the rotor that are both optimally shaped and optimally distributed to produce more torque with less torque ripple than conventional designs.

DETAILED DESCRIPTION

Figure 1A:
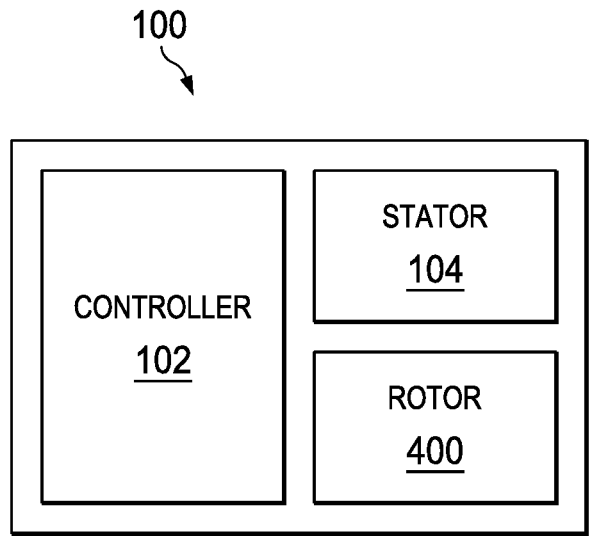
FIG. 1A is an architecture diagram of an electromechanical machine including a controller.

Referring to FIG. 1A, electromechanical device 100 converts between electricity and torque. Electromechanical device 100 includes stator 104 and rotor 400. Stator 104 includes set of poles 200 and set of coils 300 and is further described below. Device 100 operates as either a motor (converting electricity to torque) or a generator (converting torque to electricity).

In one embodiment, controller 102 for device 100 is an analog machine that includes one or more circuits with one or more transistors, resistors, inductors, and capacitors. In another embodiment, controller 102 for device 100 is a digital machine that includes one or more processors and memory, with the memory including instructions that when executed by the processor cause the controller to operate device 100 as a motor or a generator. Operation as a motor is performed by energizing the coils of device 100 according to one or more profiles, as is further described below.

Figure 1B:
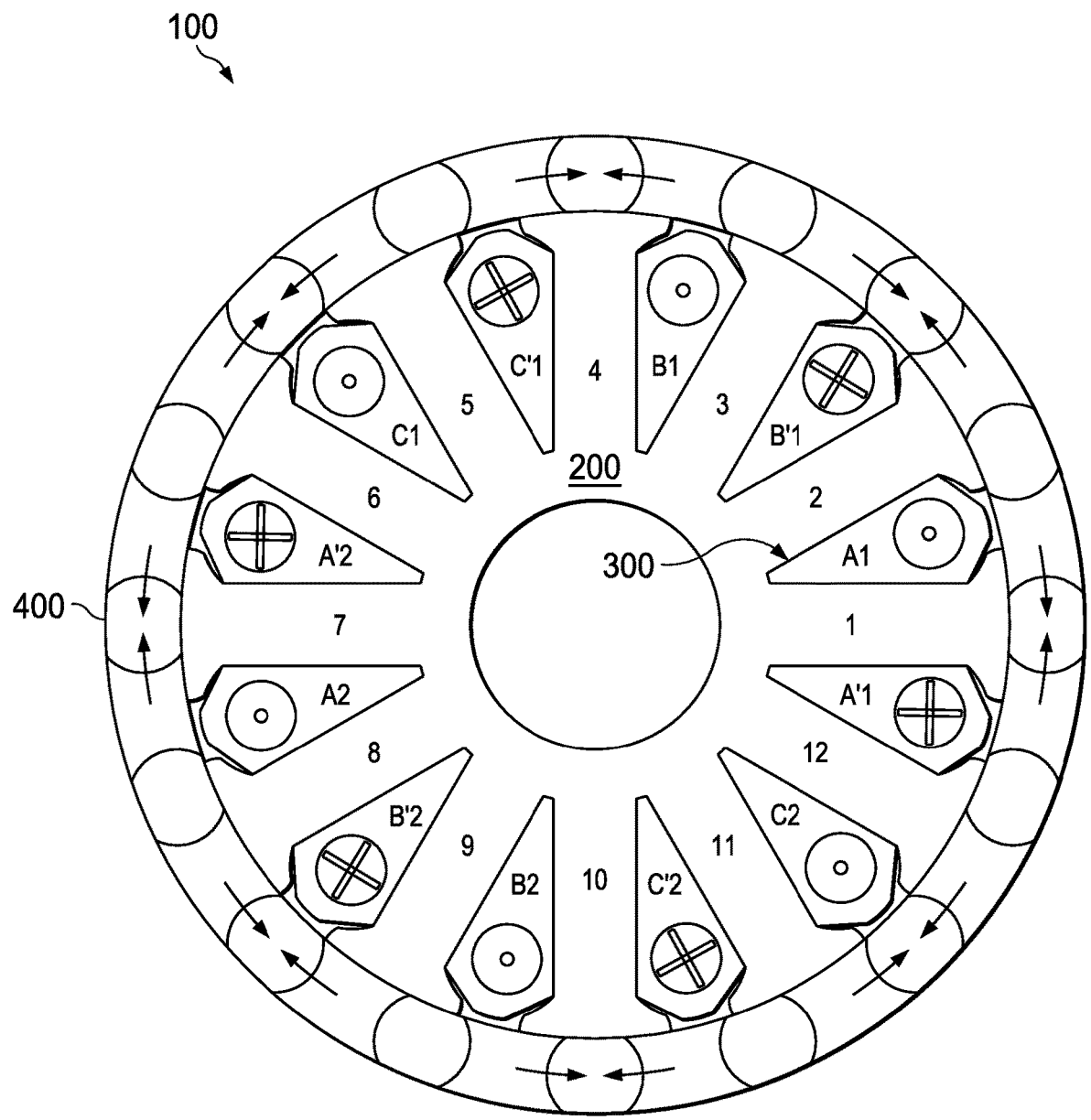
FIG. 1B is a cross section of an electromechanical machine.

Referring to FIG. 1B, device 100 is an electromechanical device, such as a motor or generator, that includes set of poles 200, set of coils 300, and rotor 400, which are each further described below. The dots and crosses on set of coils 300 indicate the directional current flow (dots out of the page and crosses into the page) through the coils when a positive current is applied for each phase of the three phases A, B, and C used with device 100.

Table 1 below describes characteristics of a preferred embodiment that is superior and novel in view of conventional designs.

TABLE 1

|  | New Design |
| --- | --- |
| Active Diameter (mm) | 264 |
| Active length (mm) | 100 |
| Stack length (mm) | 50 |
| Winding type | Short pitch |
| Slot fill factor | 50% |
| Number of stator slots | 12 |
| Number of rotor pole pairs | 8 |
| Iron weight (Kg) | 11.6 |
| Copper Weight (Kg) | 8.1 |
| Magnet Weight (kg) | 2.3 |
| Peak torque (N · m) at 20 (A/mm$^2$) | 445 |
| Maximum torque density (N · m/L) | 81.3 |
| Torque weight ratio (N · m/Kg) | 20.2 |

Figure 2:
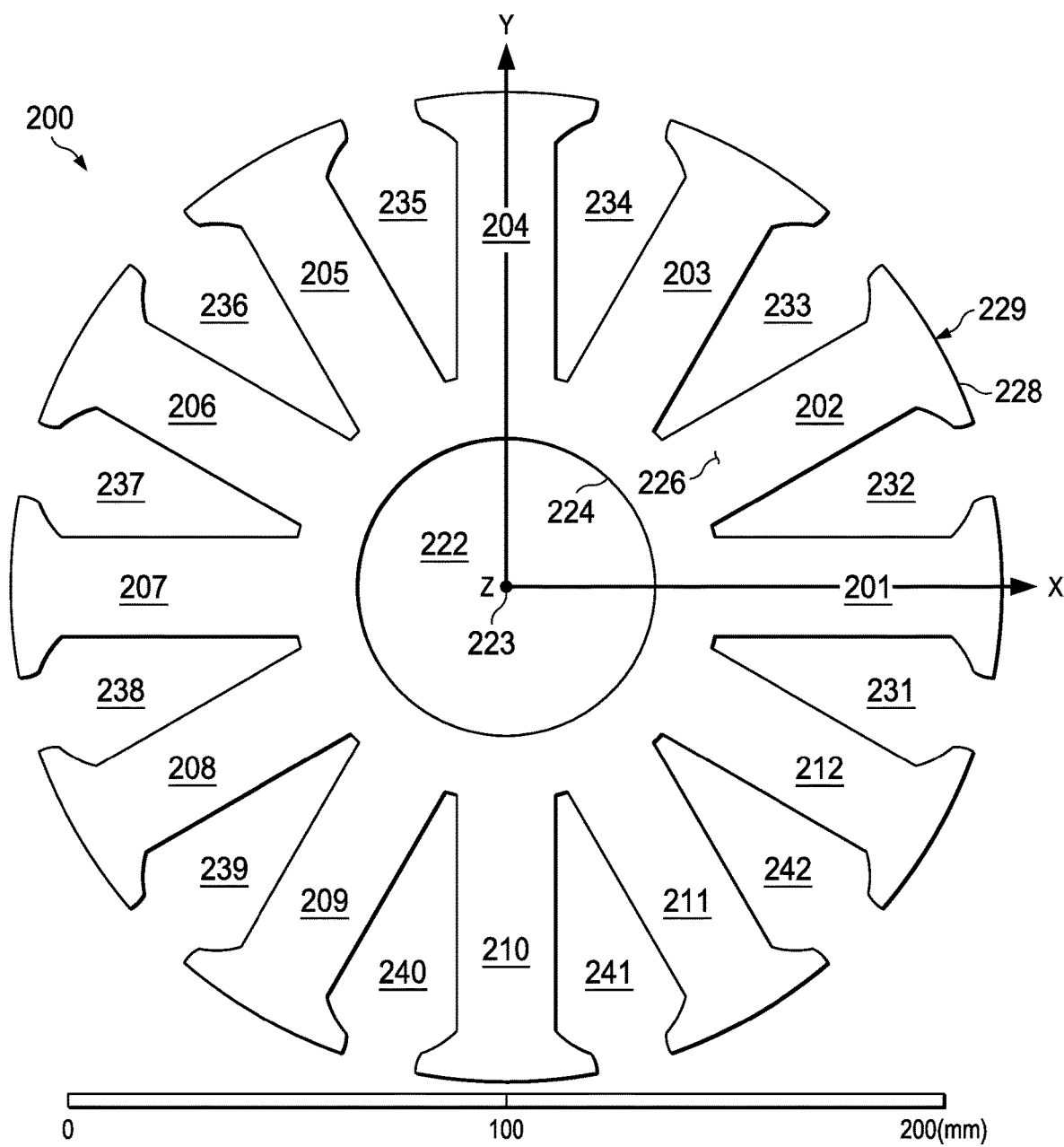
FIG. 2 is a cross section of a stator.

Referring to FIG. 2, the stator of device 100 includes set of poles 200, which has cross section 222. Set of poles 200 includes poles 201 through 212. Poles 201 through 212 each include a proximal end and a distal end. As an example, pole 202 has proximal end 226 and distal end 228.

Each of poles 201-212 extends from a proximal end, adjacent cavity 222, to a distal end at the perimeter of the stator. Each of poles 201-212 is connected at its proximal end to each of two adjacent poles, at base 224. Each pole at its distal end includes a flange. Each flange has an outermost surface 229. Each outermost surface is curved with its curvature defined by a circle centered at origin 223 of inner cavity 222 and having a radius equal to the distance from origin 223 of inner cavity 222 to outermost surface 229. Poles 201 and 207 are associated with phase A, poles 203 and 209 are associated with phase B, and poles 205 and 211 are associated with phase C.

Pole cavities 231 through 242 are between adjacent pairs of poles 201 through 212. Pole cavities 231 through 242 provide spacing for the windings of the coils of the device. In a preferred embodiment, set of poles 200 is formed as a single piece of extruded steel of a desired length.

Figure 3:
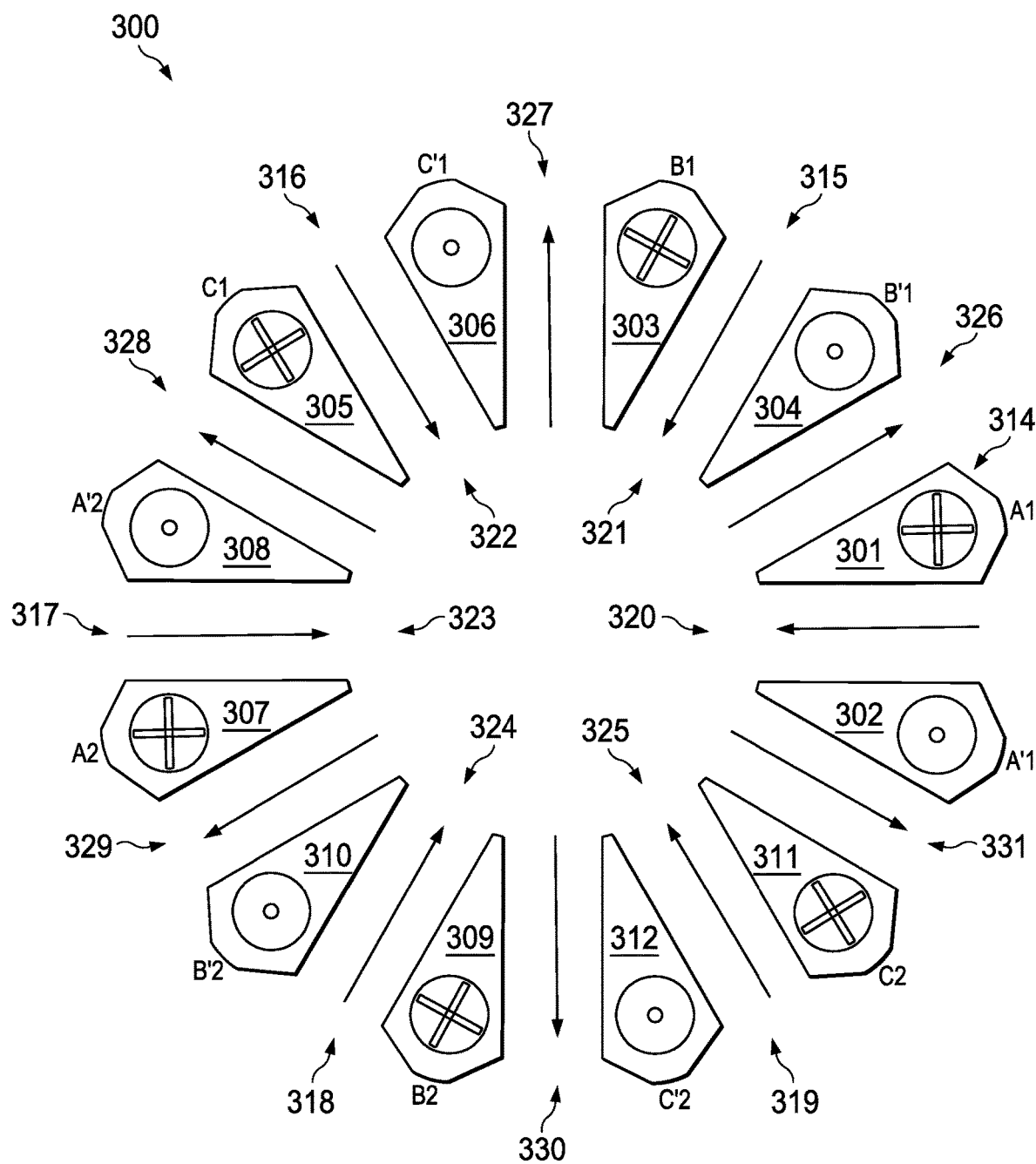
FIG. 3 is a cross section of sections of windings.

Referring to FIG. 3, set of coils 300 includes six wedge shaped coils 314 through 319. Each coil 314 through 319 is made up of multiple windings of wire around a respective pole of set of poles 200. The windings of coils 314, 315, 316, 317, 318, and 319 are respectively wrapped around poles 201, 203, 205, 207, 209, and 211. Each coil 314 through 319 includes a first section (301, 303, 305, 307, 309, and 311) and a second section (302, 304, 306, 308, 310, 312).

When a current (defined as either positive or negative) is applied to coils 314 through 319, each first section (A1 301, B1 303, C1 305, A2 307, B2 309, and C2 311) has current flowing into the page and each second section (A'1 302, B'1 304, C'1 306, A'2 308, B'2 310, C'2 312) has current flowing out of the page, which is indicated by the dots and crosses on each section. This is reversed from what is shown in FIG. 1B, where each first section (A1, B1, C1, A2, B2, and C2) has current flowing out of the page and each second section (A'1, B'1, C'1, A'2, B'2, C'2) has current flowing into the page.

Magnetic fields generated within coils 314 through 319 are oriented in directions 320 through 325 towards the center of device 100 and away from rotor 400. Magnetic fields generated between coils 314 through 319 are oriented in directions 326 through 331 away from the center of device 100 and towards rotor 400.

As shown, device 100 has three phases and six concentrated windings that form the six coils 314 through 319. Each phase includes two coils. Six stator poles (stator poles 201 and 207 for phase A, stator poles 203 and 209 for phase B, and stator poles 205 and 211 for phase C) have windings which are wound around them to form coils 314 through 319. The other six stator poles (stator poles 202, 204, 206, 208, 210, and 212) do not have windings wrapped around them. As shown in FIGS. 1-3, phase A windings A1 and A'1 in sections 301 and 302 that form coil 314 are wrapped around stator pole 201. Phase B windings B1 and B'1 in sections 303 and 304 that form coil 315 are wrapped around stator pole 203. Stator pole 202 is adjacent to windings A1 in section 301 of phase A and to windings B'1 in section 304 of phase B, but the windings of A1 and B'1 are not wrapped around pole 202. In a preferred embodiment, current coming out of the page (of FIG. 3) from winding A'1 in section 302 flows over and across a top edge of stator pole 201 (of FIG. 2) and then into the page (of FIG. 3) at winding A1 in section 301, and current flowing into the page at winding A1 in section 301 flows under and across a bottom edge of stator pole 201 (of FIG. 2) and then out of the page (of FIG. 3) at winding A'1 in section 302. The phases, windings, sections, and poles are summarized in Table 2 below.

TABLE 2

| Phase | Windings | Sections (FIG. 3) | Pole (FIG. 2) |
|---|---|---|---|
| A | A1, A'1 | 301, 302 | 201 |
| A | A2, A'2 | 307, 308 | 207 |
| B | B1, B'1 | 303, 304 | 203 |
| B | B2, B'2 | 309, 310 | 209 |
| C | C1, C'1 | 305, 306 | 205 |
| C | C2, C'2 | 311, 312 | 211 |

Figure 4A:
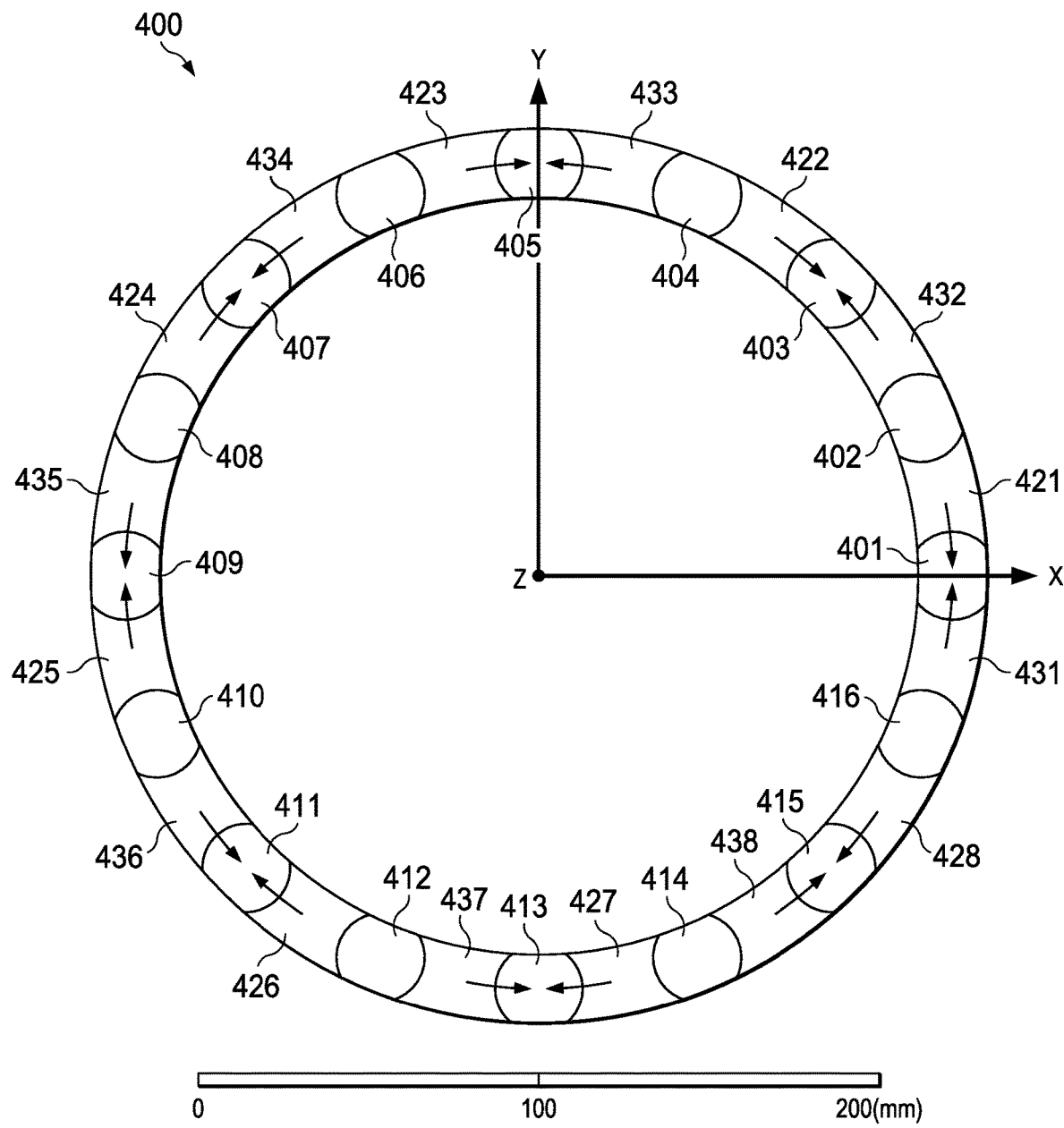
FIG. 4A is a cross section of a rotor.

FIGS. 4A through 4D show rotor 400. Rotor 400 has 16 steel segments (401 through 416) and 16 magnet segments (421 through 428 and 431 through 438). All magnets are magnetized in a tangential direction, as shown in FIG. 4A with black arrows. The direction of magnetization in magnets 421 through 428 is clockwise and the direction of magnetization of the magnets 431 through 438 is counter-clockwise. As discussed further below, the magnets have a "double concave" cross section as shown in the Figures to reduce the torque ripple. One steel segment, having a generally cylindrical cross section, is positioned between the concave sides of each pair of two magnets.

Referring to FIG. 4A, rotor 400 includes steel segments 401 through 416, magnets 421 through 428, and magnets 431 through 438. Steel segments 401 through 416, magnets 421 through 428, and magnets 431 through 438 form a cylindrical shell having an inner surface and an outer surface that each have a circular cross section. Steel segment 401 is located at about 0 degrees on rotor 400, magnet 421 is located at about 11.25 degrees on rotor 400, steel segment 402 is located at about 22.5 degrees, and magnet 432 is located at about 33.75 degrees. This pattern and placement repeats along rotor 400. Each steel segment is the same shape. Each magnet is the same shape. Each of the steel segments fits into its adjacent magnets in the same way.

Figure 4B:
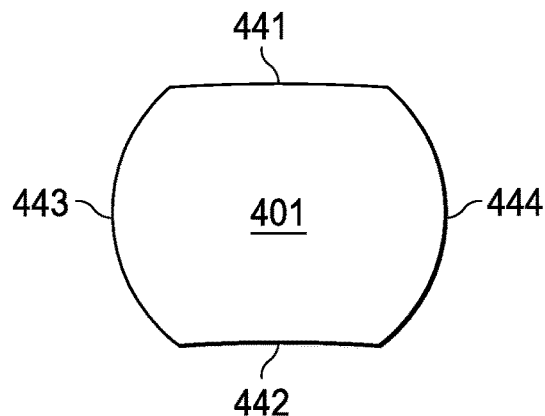
FIG. 4B is a cross section of a metal segment.

Referring to FIG. 4B, a cross-section of steel segment 401 is shown. Steel segment 401 includes outer surface 441, inner surface 442, first convex surface 443, and second convex surface 444. First convex surface 443 fits into second concave surface 454 of magnet 421 and second convex surface 444 fits into first concave surface 463 of magnet 431.

Figure 4C:
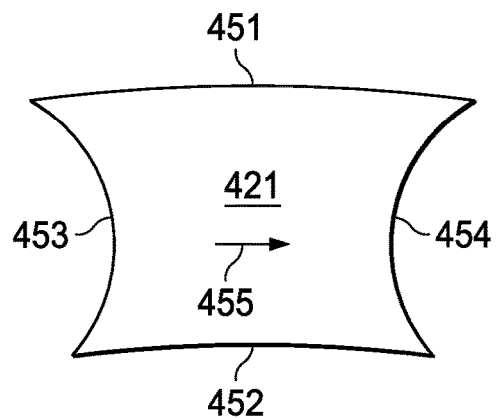
FIG. 4C is a cross section of a first magnet.

Referring to FIG. 4C, a cross section of magnet 421 is shown. Magnet 421 includes outer surface 451, inner surface 452, first concave surface 453, and second concave surface 454. Magnet 421 is formed so that direction 455 of the magnetic field of magnet 421 is tangential to the motion of rotor 400, is pointed from first concave surface 453 towards second concave surface 454, and is opposite direction 465 of the magnetic field of magnet 431. First concave surface 453 fits into a second convex surface of steel segment 402 and second concave surface 454 fits into first convex surface 443 of steel segment 401.

Figure 4D:
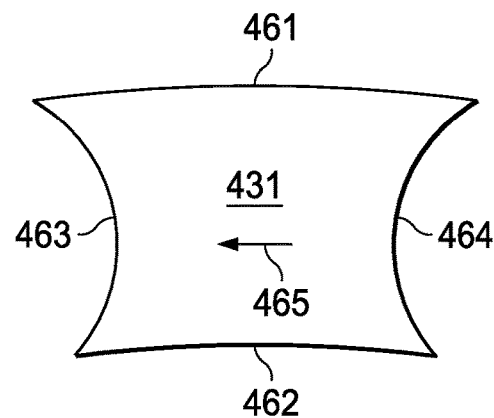
FIG. 4D is a cross section of a second magnet.

Referring to FIG. 4D, a cross section of magnet 431 is shown. Magnet 431 includes outer surface 461, inner surface 462, first concave surface 463, and second concave surface 464. Magnet 431 is formed so that direction 465 of the magnetic field of magnet 431 is tangential to the motion of rotor 400, is pointed from second concave surface 464 towards first concave surface 463, and is opposite direction 455 of magnet 421. First concave surface 463 fits into second convex surface 444 of steel segment 401 and second concave surface 464 fits into a first convex surface of steel segment 416.

The outer surfaces of steel segments 401 through 416, magnets 421 through 428, and magnets 431 through 438 form the outer perimeter of rotor 400. The inner surfaces of steel segments 401 through 416, magnets 421 through 428, and magnets 431 through 438 form the inner perimeter of rotor 400.

In a preferred embodiment, each magnet includes at least four ellipsoidal curved surfaces. Two of the surfaces are perpendicular to a central longitudinal axis of the machine at the center of the stator with an inner curved surface being concave and an outer curved surface being convex. The other two curved surfaces are each concave at the poles of the magnet.

The magnetic vectors in cylindrical coordinates are listed in Table 3 below:

TABLE 3

| Magnets | R Component | Phi Component | Z Component |
|---|---|---|---|
| 421 through 428 | 0 | −1 | 0 |
| 431 through 438 | 0 | 1 | 0 |

Equation 1 shows relationship between voltage, current, and flux linkage for device 100. Since the three phases are decoupled, the mutual inductance is negligible and Equation 1 can be applied for all three phases.

$$V = r*i(t) + \frac{d\lambda(i, \theta)}{dt} =$$
$$r*i(t) + \frac{d\lambda}{di}*\frac{di}{dt} + \frac{d\lambda}{d\theta}*\frac{d\theta}{dt} = r*i(t) + L_{inc}\frac{di}{dt} + C_\omega*\omega$$

Eq. 1

Where, V is voltage, r is winding resistance, i(t) is winding current, λ is flux linkage, θ is rotor position, $L_{inc}$ is incremental inductance, $C_\omega$ is back electro motive force coefficient, and ω is speed.

Rotor 400 includes 8 positive pole pairs centered at steel segments 401, 403, 405, 407, 409, 411, 413, and 415. Each pole pair includes one of magnets 421 through 428 (with clockwise magnetization) and one of magnets 431 through 438 (with counter-clockwise magnetization). There is 45 mechanical degrees of rotation between the centers of adjacent pole pairs on the rotor. Device 100 has 8 pole pairs on rotor 400 so that one electrical cycle equates to 45 mechanical degrees of rotation of rotor 400. The electromagnetic torque will be produced for negative and positive DC currents for one electrical cycle.

As discussed further below, the electromagnetic torque is reversed when the current is reversed. This achieves positive average electromagnetic torque by reversing the excitation current in the second half of each electrical cycle. Device 100 has three phases and there are three electromagnetic torques with 120 electrical degrees difference. The voltage, flux linkage, and electromagnetic torques of phase A, phase B, and phase C are discussed further below, as well as the summation of electromagnetic torques of the three phases.

Figure 5A:
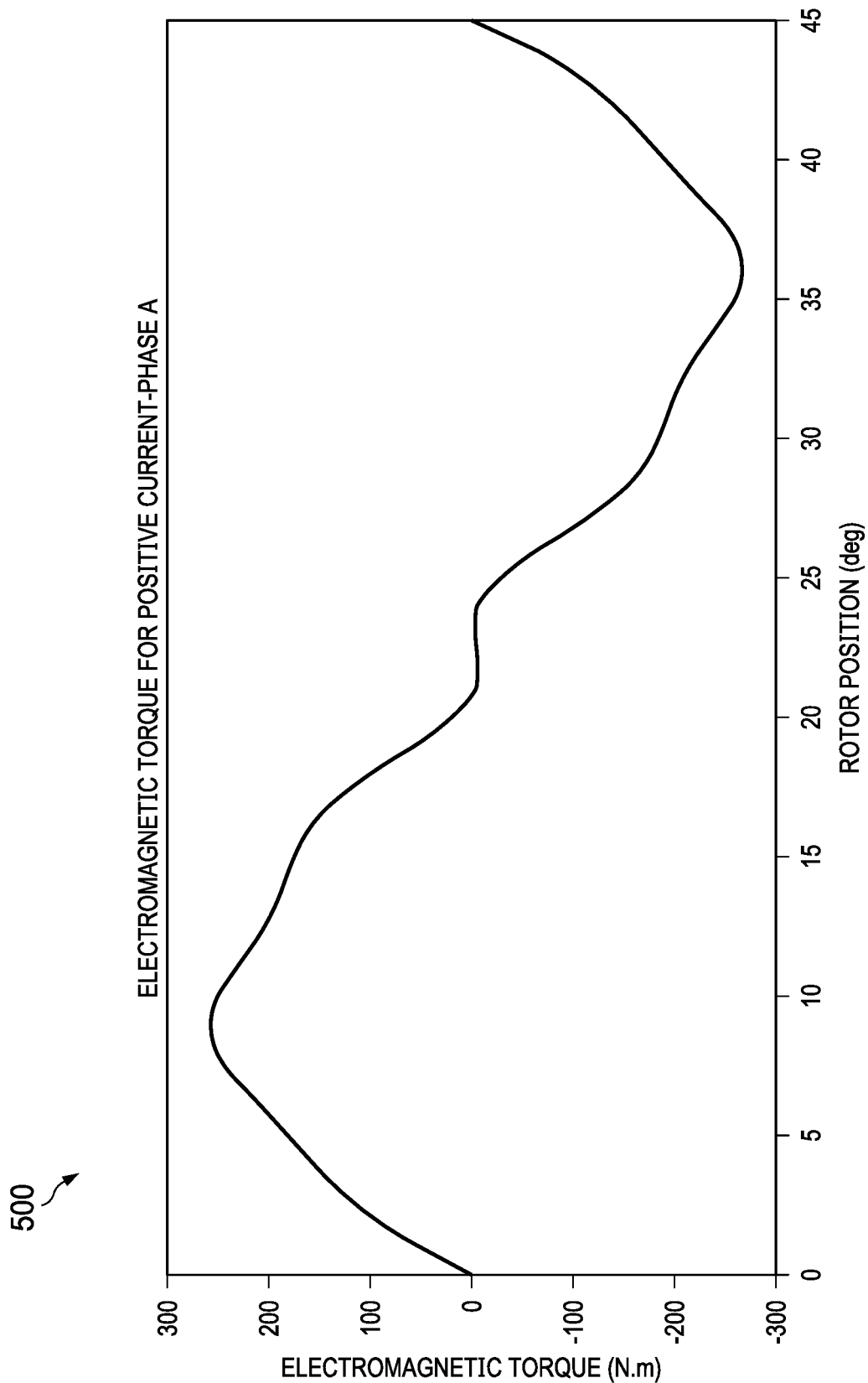
FIG. 5A is a graph of electromagnetic torque for positive DC currents.

Referring to FIG. 5A, chart 500 shows the electromagnetic torque in Newton meters that is experienced by rotor 400 as a function of the position of the rotor in degrees from 0 to 45 degrees when a positive current is continuously applied to the phase A coils 314 and 317. The torque is positive from about 0 degrees to about 22.5 degrees and is negative from about 22.5 degrees to about 45 degrees. One of skill in the art will recognize that the tolerance for the rotor positions and torque values can be ±2.5 degrees in each case disclosed.

As can be seen in FIG. 5A, beginning at about 0 degrees rotor position, the electromagnetic torque increases rapidly to approximately 260 Nm peaking at about 8 degrees. The slope of the rise changes slightly at around 4 degrees rotor position. Starting at about 8 degrees rotor position, the torque declines in a bimodal slope fashion reaching a plateau at around 22.5 degrees rotor position with an electromagnetic torque of approximately 0. At approximately 24 degrees rotor position, the electromagnetic torque turns negative, decreasing in a bimodal fashion to around 37 degrees where it reaches a minimum at approximately −260 Nm. At around 33 degrees, the slope turns positive returning to 0 Nm at about 45 degrees rotor position.

Figure 5B:
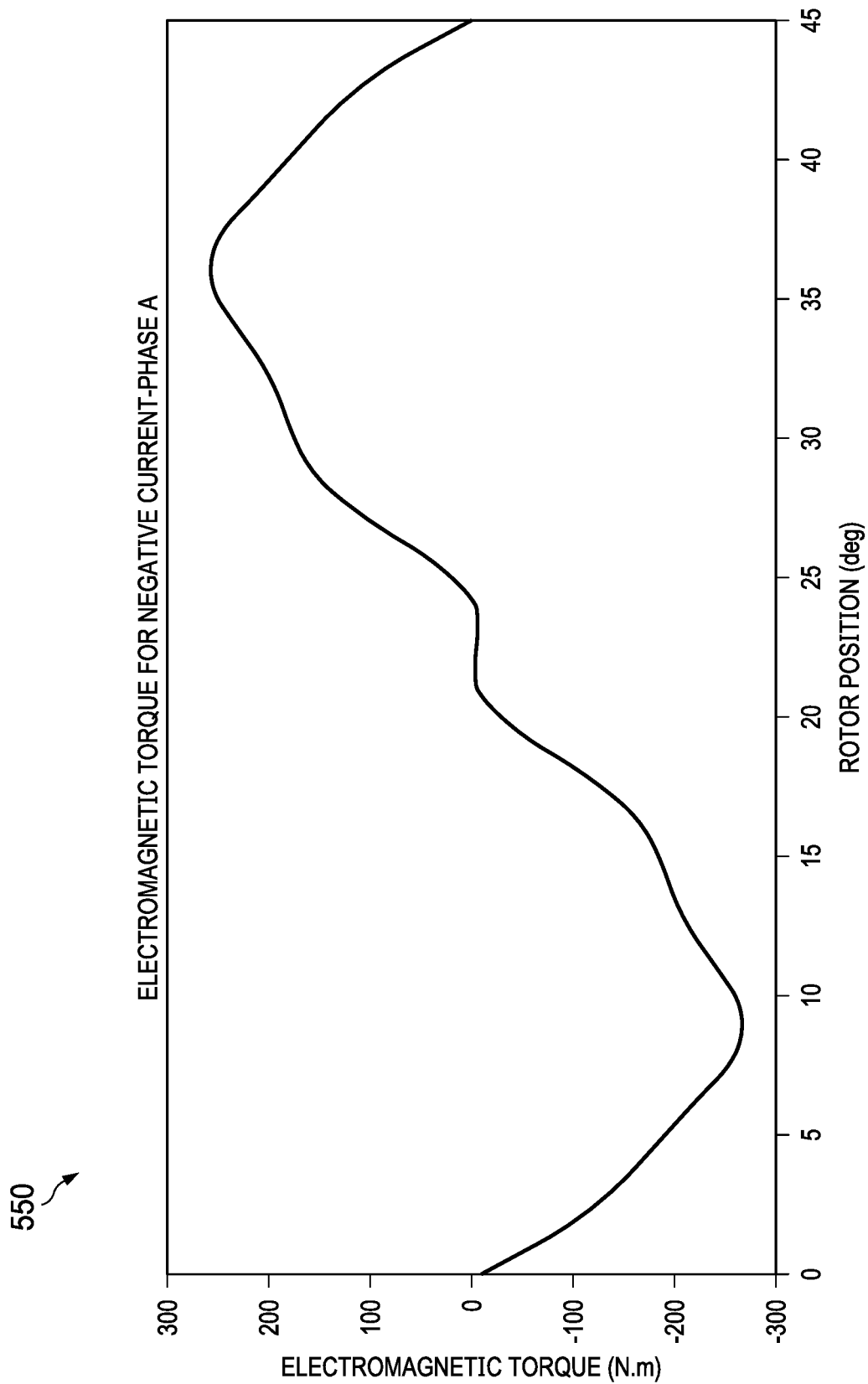
FIG. 5B is a graph of electromagnetic torque for negative DC currents.

Referring to FIG. 5B, chart 550 shows the electromagnetic torque in Newton meters that is experienced by rotor 400 as a function of the position of the rotor in degrees from about 0 degrees to about 45 degrees when a negative current is continuously applied to the phase A coils 314 and 317. The torque experienced by the rotor is the opposite of that shown in chart 500.

As can be seen from FIG. 5B, the electromagnetic torque decreases from 0 to approximately −260 Nm over the range between 0 degrees and about 8 degrees rotor position. The decline in electromagnetic torque assumes a bimodal fashion decreasing at more quickly between 0 degrees and about 3 degrees, and recovering between 3 degrees and about 8 degrees. The electromagnetic torque reaches a minimum at about 8 degrees rotor position exhibiting about −260 Nm electromagnetic torque. The slope turns positive around 9 degrees rotor position and increases to a plateau. The electromagnetic torque experiences a bimodal increase over this range of rotor position increasing more slowly from about 8 degrees to about 16 degrees and more quickly between about 16 degrees and about 22.5 degrees rotor position. The electromagnetic torque plateaus at about 0 Nm and 22.5 degrees and about 25 degrees. Between about 25 degrees and about 32 degrees the electromagnetic torque increases in a bimodal fashion rising more rapidly between about 24 degrees and about 28 degrees and more slowly between about 28 degrees and about 37 degrees. The maximum electromagnetic torque is reached at about 37 degrees and exhibits approximately 260 Nm at its maximum. The electromagnetic torque then declines in a bimodal fashion from about 37 degrees to about 45 degrees where it attains a value of 0 Nm.

Figure 6A:
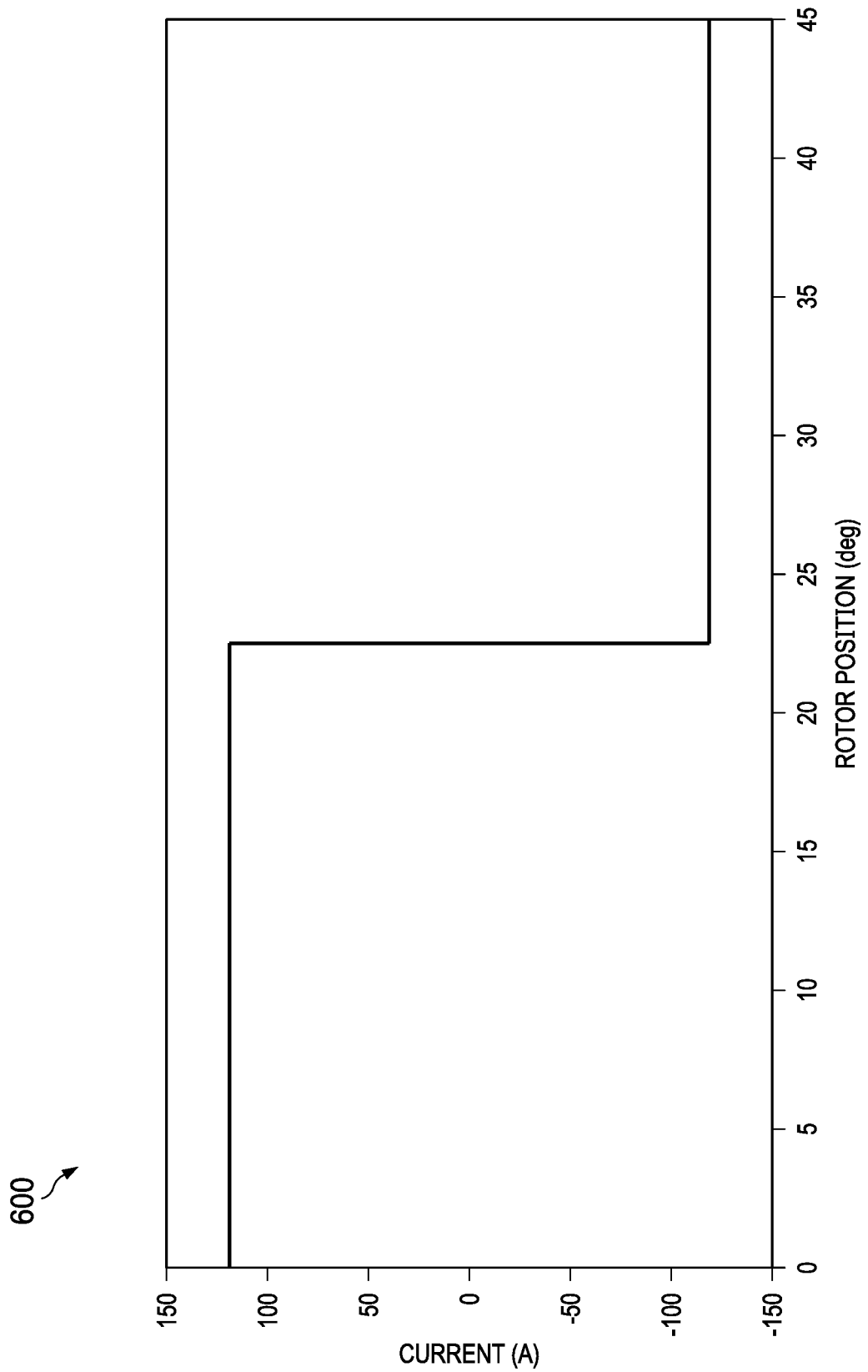
FIG. 6A is a graph of current versus rotor position.

Referring to FIG. 6A, chart 600 shows the current profile used by a controller of device 100 in operation for phase A with the current supplied to phase A as a function of the position of rotor 400 in degrees. Between about 0 degrees and about 22.5 degrees, about 110 amps of positive current is supplied. Between about 22.5 degrees and about 45 degrees, about 110 amps of negative current is supplied. This pattern repeats every 45 degrees.

Figure 6B:
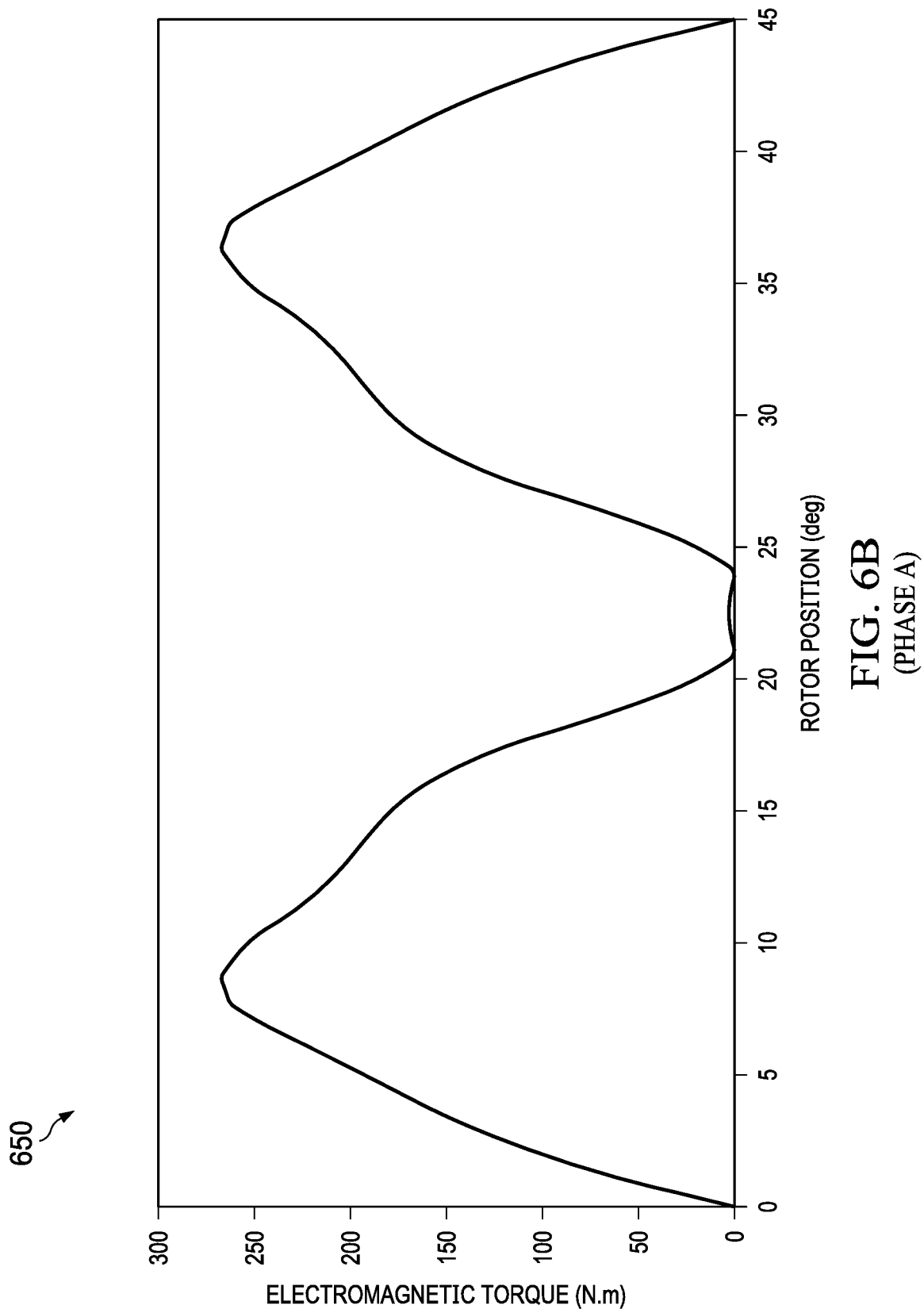
FIG. 6B is a graph of electromagnetic torque of phase A versus rotor position.

Referring to FIG. 6B, chart 650 shows the torque applied to rotor 400 from the coils of phase A of device 100 when the current profile from chart 600 is used to operate device 100 by a controller. By switching from a positive current to a negative current at about 22.5 degrees, the applied torque is positive through the entire 45 degrees cycle.

As shown in FIG. 6B, the electromagnetic torque increases from about 0 degrees to about 8 degrees rotor position, reaching a maximum of approximately 260 Nm. The curve increases in three modes, most rapidly between 0 degrees and about 3 degrees, less rapidly between 3 degrees and about 7 degrees and far less rapidly between 7 degrees and about 9 degrees rotor position. The electromagnetic torque is at a maximum of about 260 Nm at around 9 degrees rotor position and then declines in a bimodal fashion having a less rapid decline between about 9 degrees and about 14 degrees and a more rapid decline between about 14 degrees and about 21 degrees rotor position. The electromagnetic torque curve exhibits two minimums, one at about 21 degrees and one at about 24 degrees rising slightly to approximately 3 Nm at around 22.5 degrees rotor position in between.

Between about 22.5 degrees and 45 degrees, the electromagnetic torque curve exhibits a stereoscopic identity with the curve between 0 degrees and 22.5 degrees. More specifically, the torque increases in a bimodal fashion between about 24 degrees and 29 degrees and rising less rapidly between 29 degrees and about 36 degrees, reaching a maximum at about 260 Nm at approximately 36 degrees rotor position. The curve then declines in three modes, the least rapid between about 37 degrees and about 38 degrees more rapidly between about 38 degrees and about 42 degrees and then most rapidly between about 42 degrees and about 45 degrees rotor position.

Figure 7A:
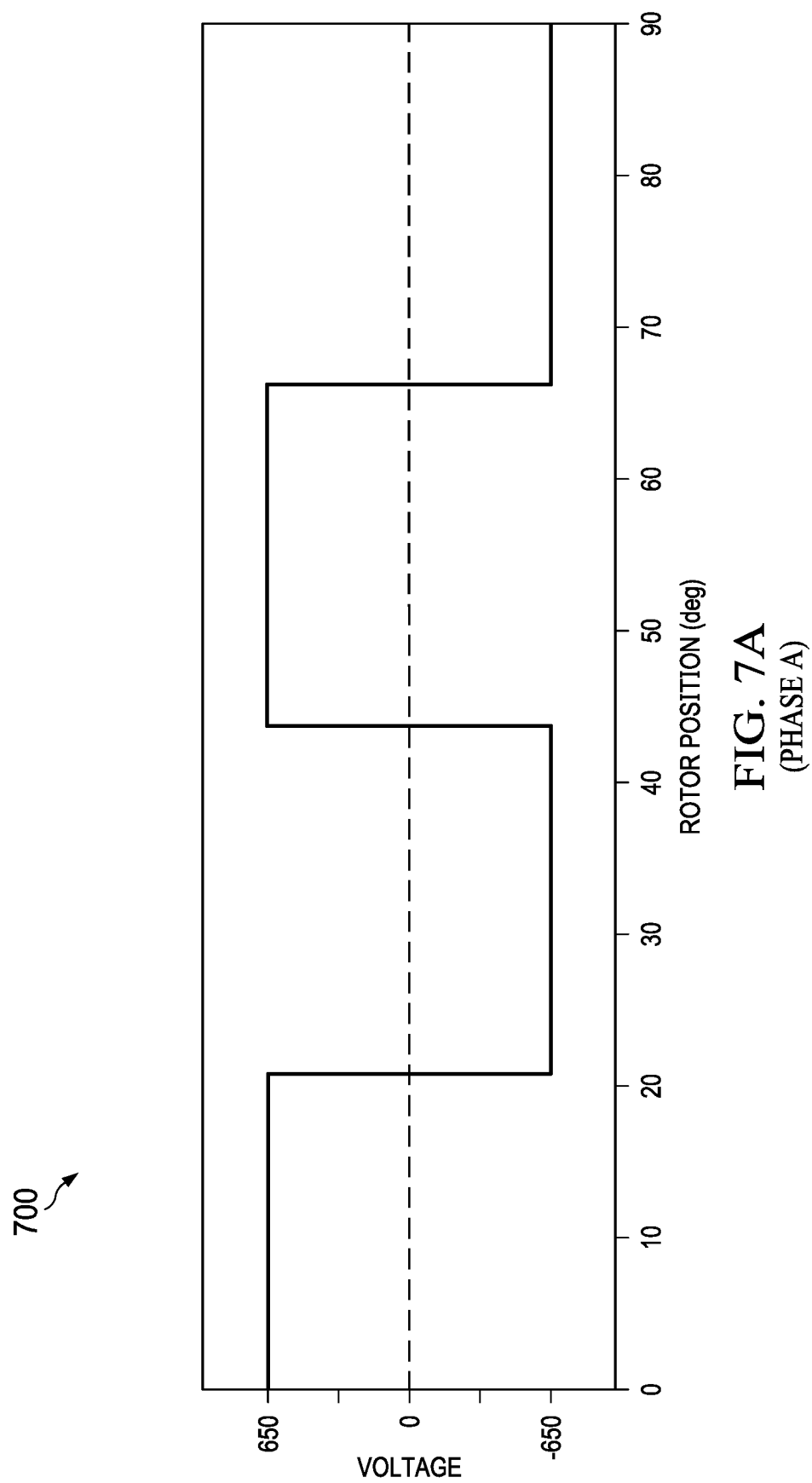
FIG. 7A is a graph of voltage of phase A versus rotor position for two electrical cycles.

Referring to FIG. 7A, chart 700 shows the voltage profile used to energize phase A during operation of device 100 by a controller. The voltage profile is in the form of a square wave, provides positive 650 volts from about 0 degrees to about 22.5 degrees, provides negative 650 volts from about 22.5 degrees to about 45 degrees, and then repeats.

Figure 7B:
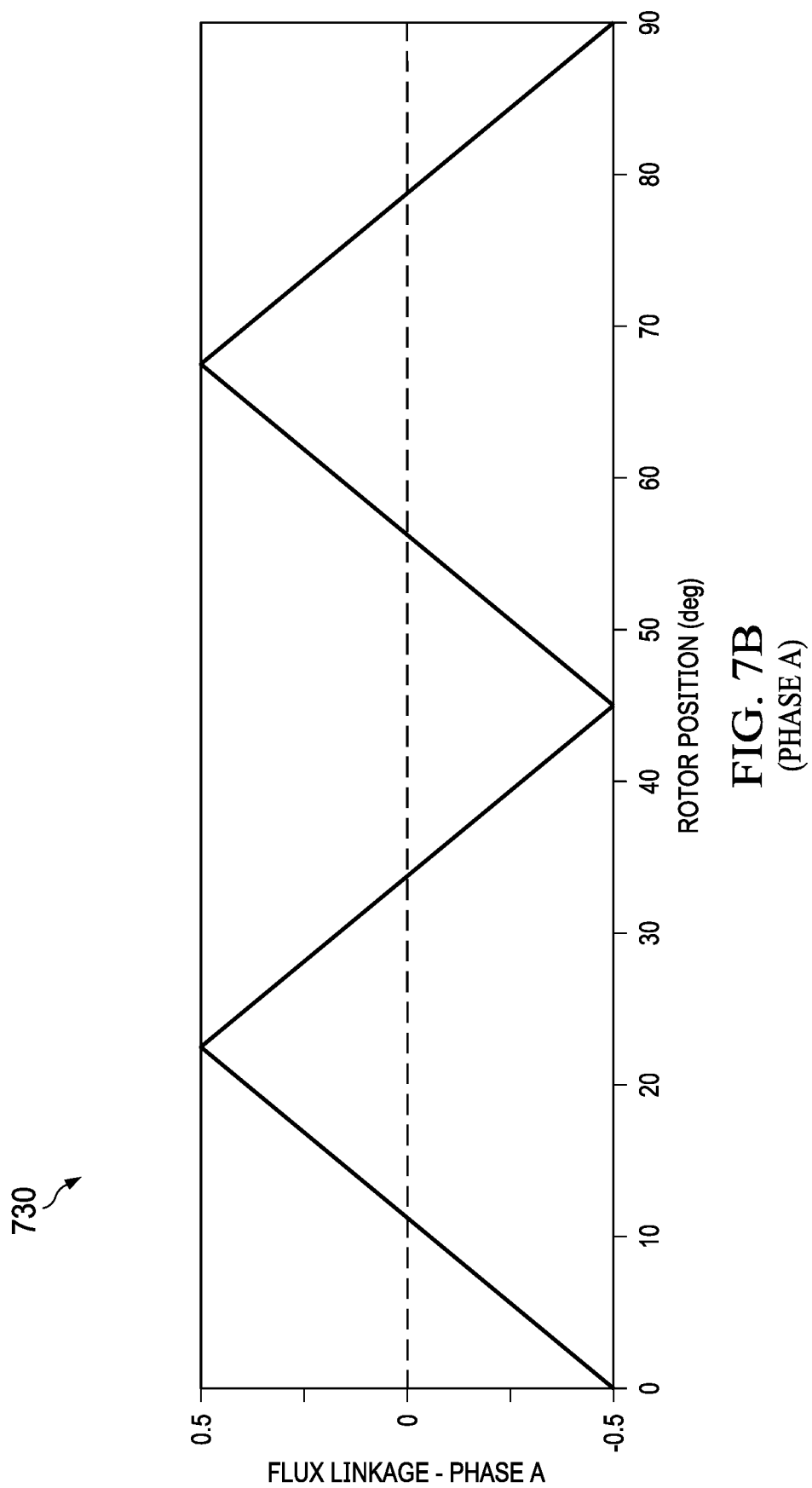
FIG. 7B is a graph of flux linkage of phase A versus rotor position for two electrical cycles.

Referring to FIG. 7B, the flux linkage for phase A of device 100 is shown as a function of the position of rotor 400 in degrees. The flux linkage is in the form of a triangle wave that starts with a flux linkage of about −0.5 degrees at about 0 degrees, linearly increases to a flux linkage of about 0.5 degrees at about 22.5 degrees, then linearly decreases back to a flux linkage of about −0.5 at 45 degrees, and then repeats. The flux linkage crosses zero at about 11.25 degrees and about 33.75 degrees, which correspond to when magnets 421 and 432 of rotor 400 align with coil 314.

Figure 7C:
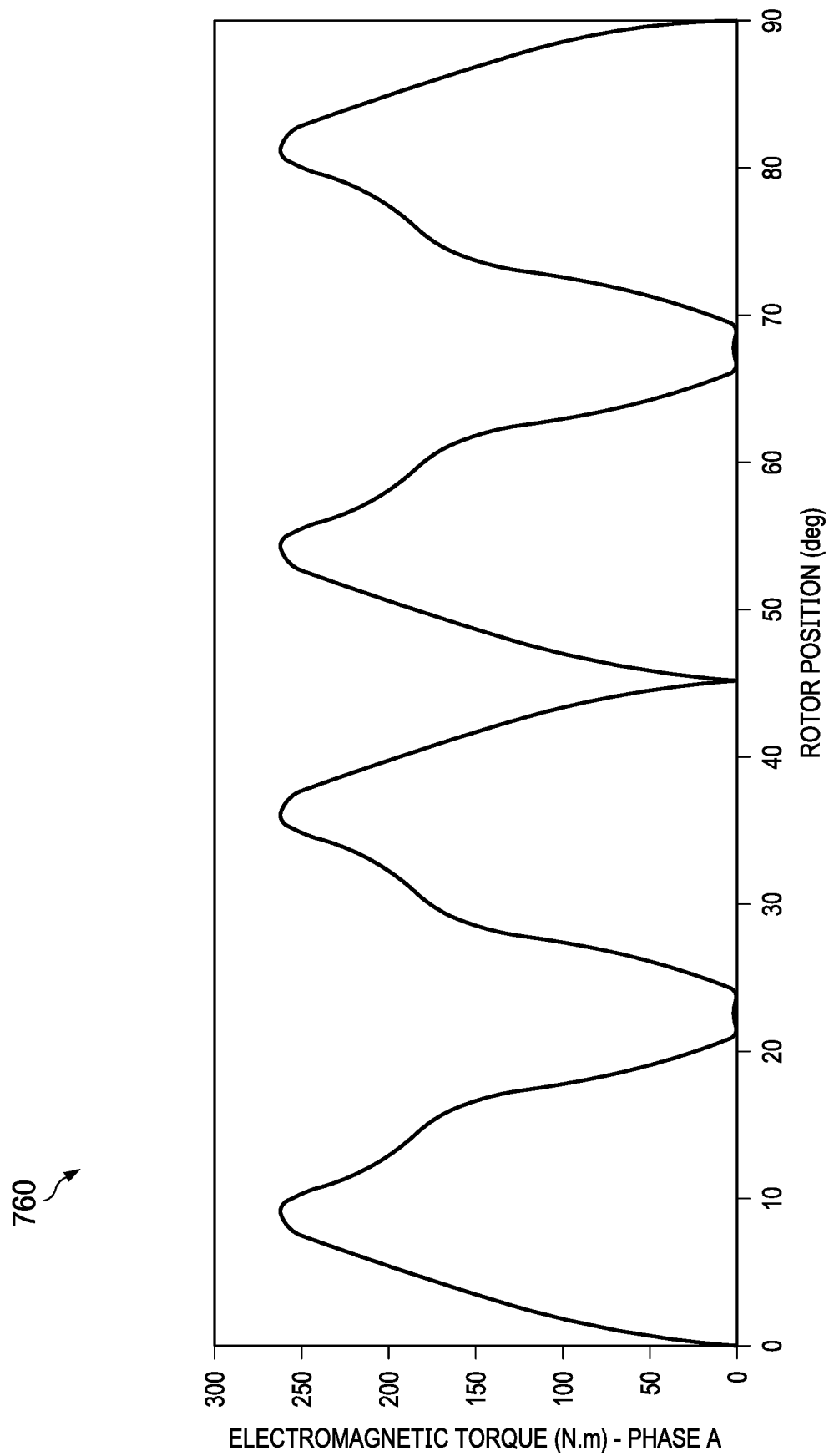
FIG. 7C is a graph of electromagnetic torque of phase A versus rotor position for two electrical cycles.

Referring to FIG. 7C, chart 760 shows the electromagnetic torque provided by phase A during operation of device 100 when the voltage profile of chart 700 is used by a controller. Phase A provides positive torque from about 0 degrees to about 22.5 degrees while a positive voltage is applied, provides a positive torque from about 22.5 degrees to about 45 degrees while a negative voltage is applied, and then repeats.

As shown in FIG. 7C, the curve assumes a stereoscopic symmetry between the range of about 0 degrees and about 45 degrees and the range of about 45 degrees and about 90 degrees. Between 0 degrees and about 9 degrees, the torque increases in a relatively constant fashion but increases less steadily between about 8 degrees and about 10 degrees, reaching a maximum at about 10 degrees rotor position and exhibiting an electromagnetic torque of approximately 260 Nm at that point. The torque exhibits a bimodal decrease between about 10 degrees and about 21 degrees rotor position decreasing more slowly between about 10 degrees and about 18 degrees and more rapidly between about 18 degrees and about 21 degrees. Between about 21 degrees and about 24 degrees the torque establishes two minimums at around 21 degrees and around 24 degrees, rising slightly to about 2 Nm at around 23 degrees in between. The torque then rises in a bimodal fashion between about 24 degrees and about 30 degrees rising more rapidly and then between about 30 degrees and about 39 degrees rising more slowly, reaching a maximum at around 38 degrees rotor position demonstrating a torque of about 260 Nm. Between about 38 degrees and 40 degrees the curve falls off slightly, and then more rapidly between about 40 degrees and about 45 degrees. The stereoscopic reverse of these characteristic features is demonstrated by the torque curve between about 45 degrees and about 90 degrees rotor position.

Figure 8A:
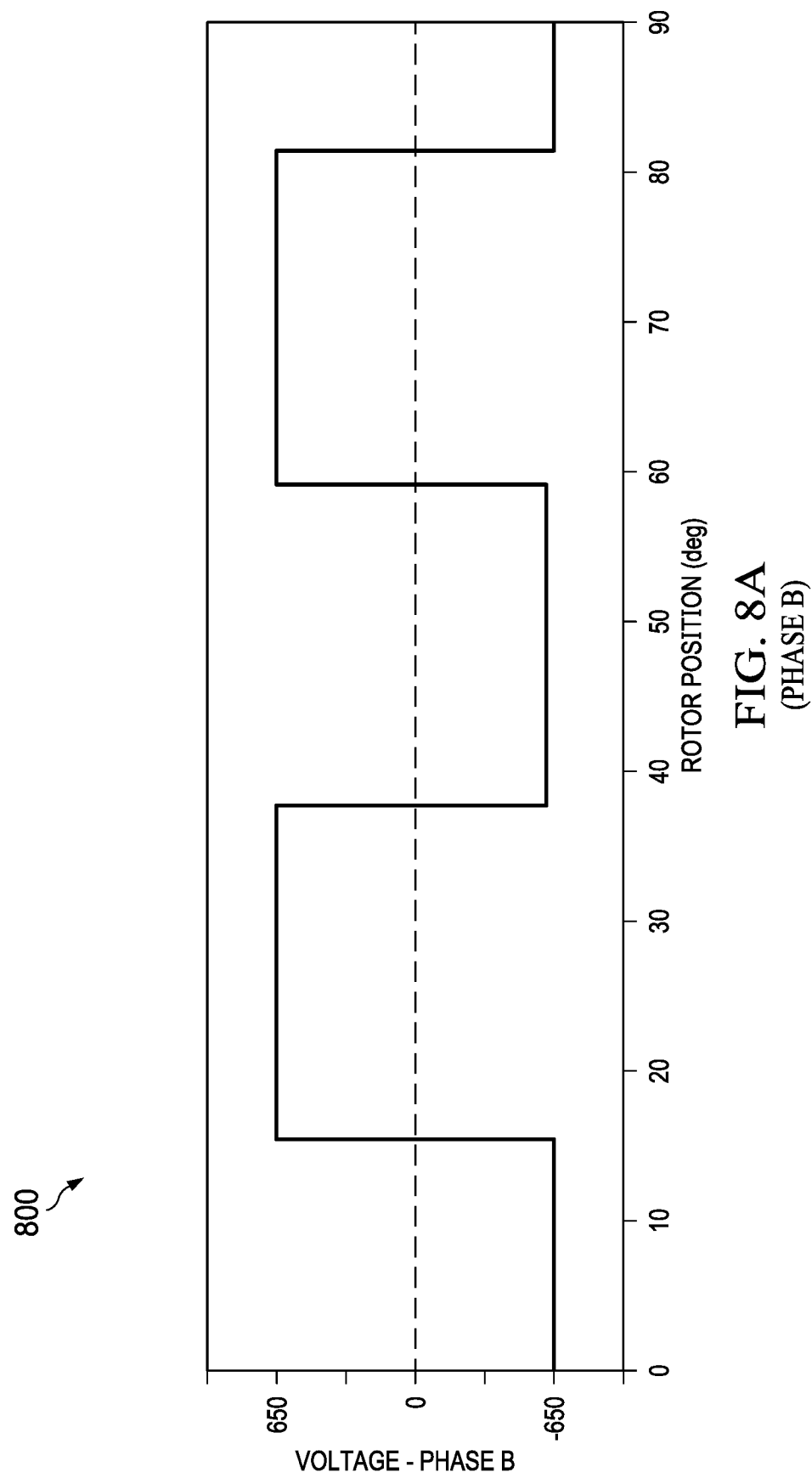
FIG. 8A is a graph of voltage of phase B versus rotor position for two electrical cycles.

Referring to FIG. 8A, chart 800 shows the voltage profile used for phase B by a controller of device 100. The voltage profile for phase B is shifted from the voltage profile for phase A, shown in chart 700, by about 15 degrees, which is determined by dividing the number of mechanical degrees in a full electrical cycle (45) by the number of phases (3).

Figure 8B:
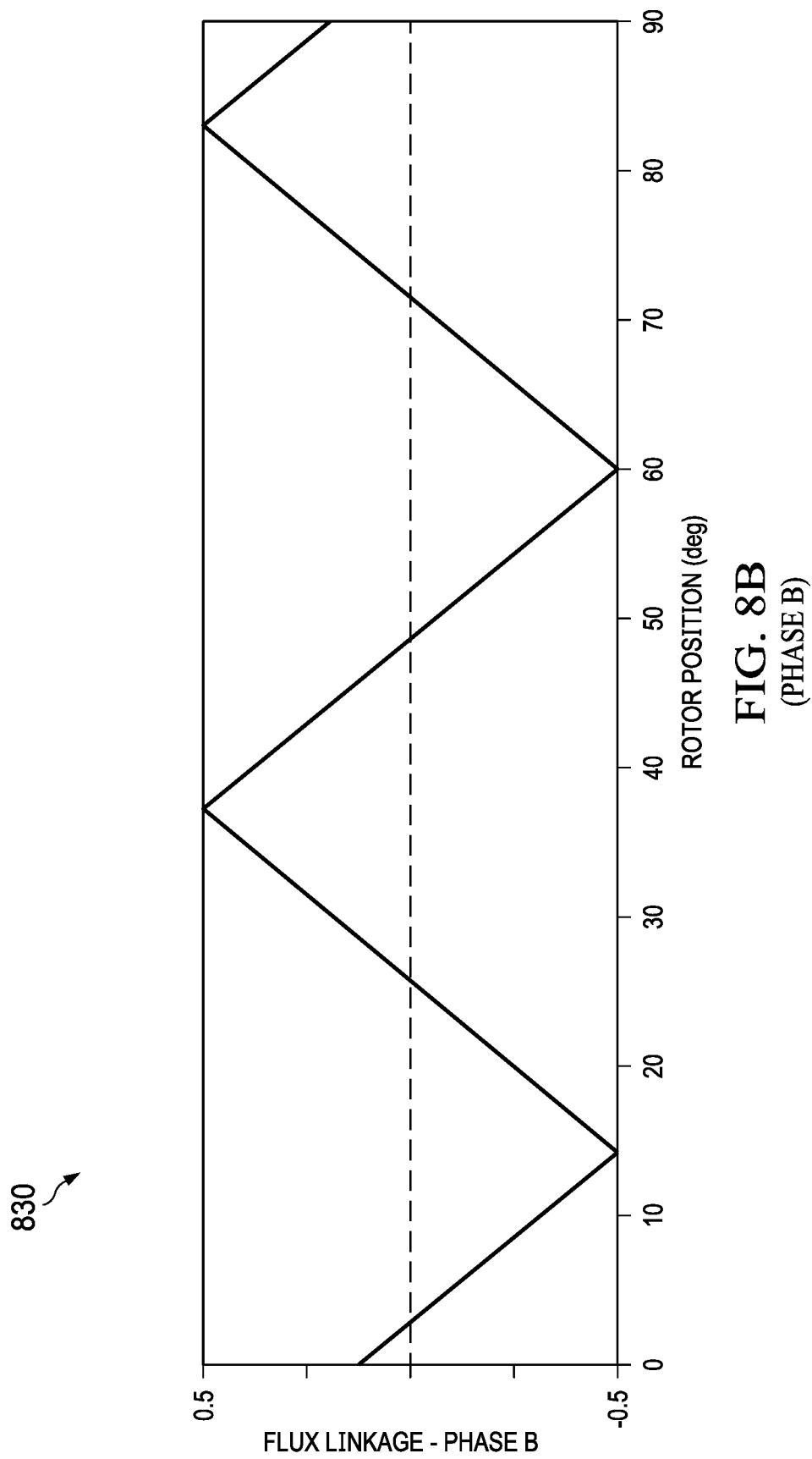
FIG. 8B is a graph of flux linkage of phase B versus rotor position for two electrical cycles.

Referring to FIG. 8B, the flux linkage for phase B as a function of rotor position in degrees is shown in chart 830. The flux linkage for phase B is shifted by 15 degrees as compared to the flux linkage for phase A.

Figure 8C:
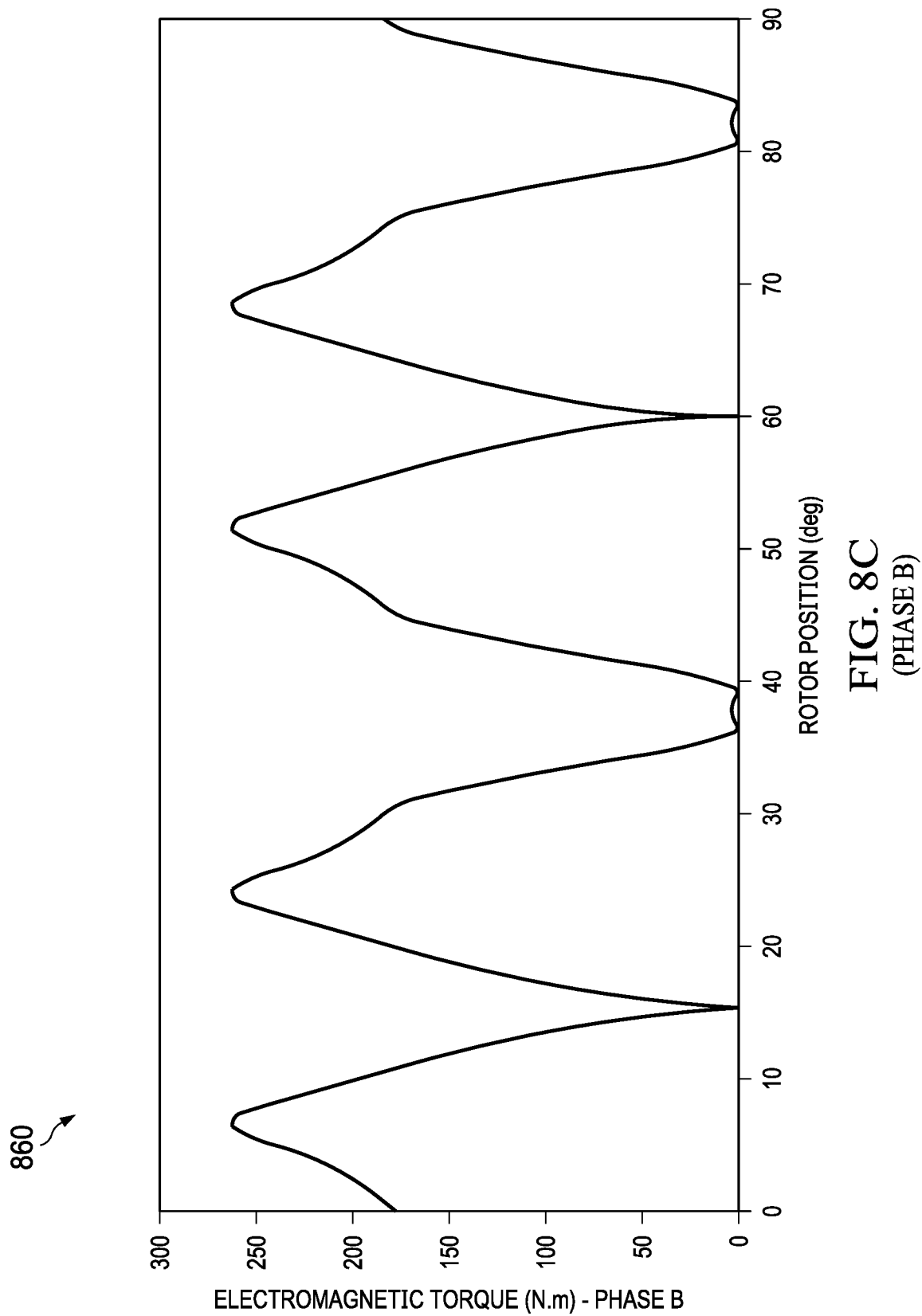
FIG. 8C is a graph of electromagnetic torque of phase B versus rotor position for two electrical cycles.

Referring to FIG. 8C, chart 860 shows the torque provided by phase B, which is shifted from the torque provided by phase A by about 15 degrees.

As can be seen, the curve demonstrates the same characteristic features as those described with respect phase A, shown in FIG. 7C, but simply is shifted by 15 degrees rotor position.

Figure 9A:
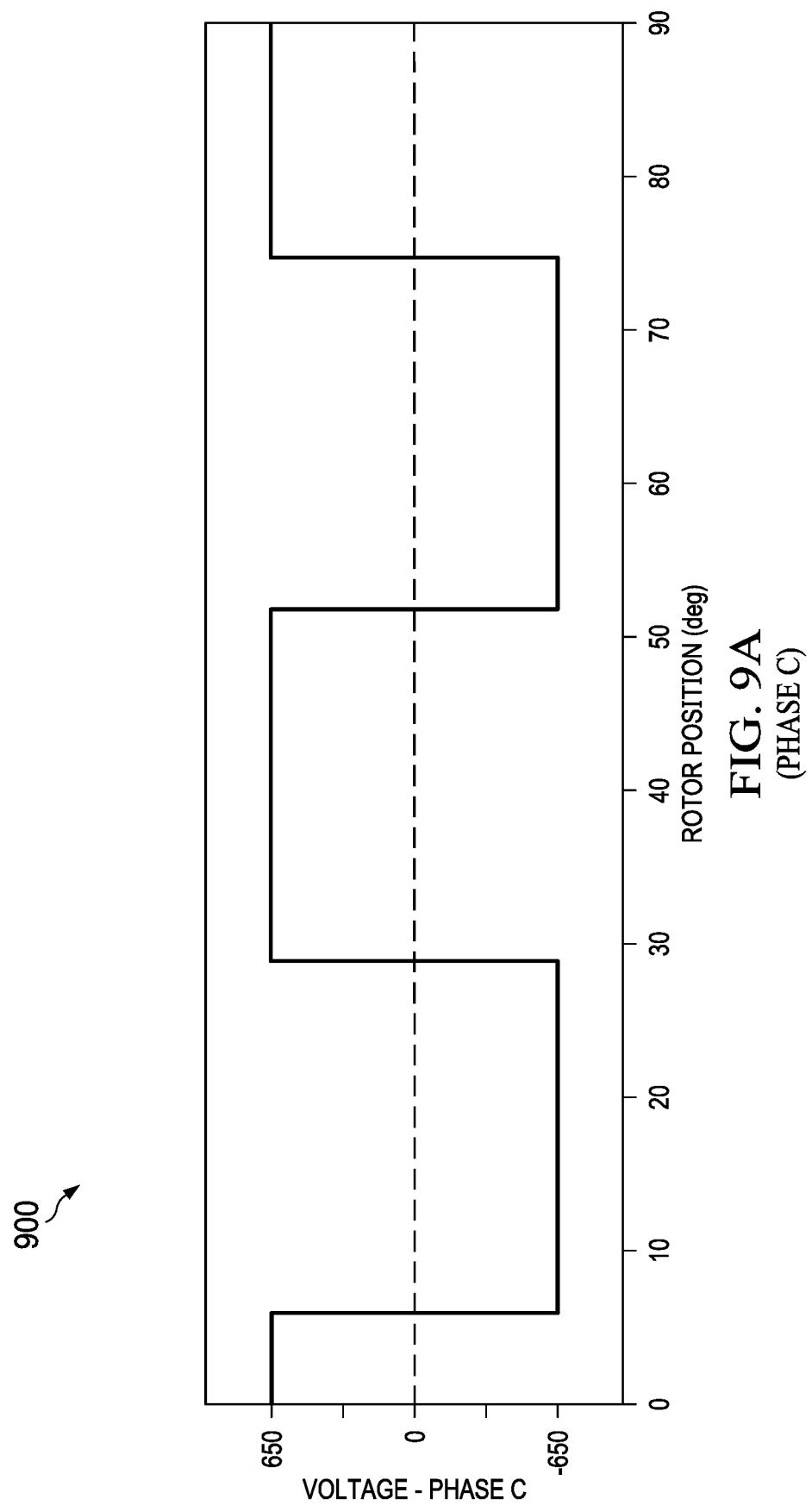
FIG. 9A is a graph of voltage of phase C versus rotor position for two electrical cycles.

Referring to FIG. 9A, chart 900 shows the voltage profile used for phase C by a controller of device 100. The voltage profile for phase C is shifted from the voltage profile for phase A, shown in chart 700, by about 30 degrees and from the voltage profile for phase B by about 15 degrees.

Figure 9B:
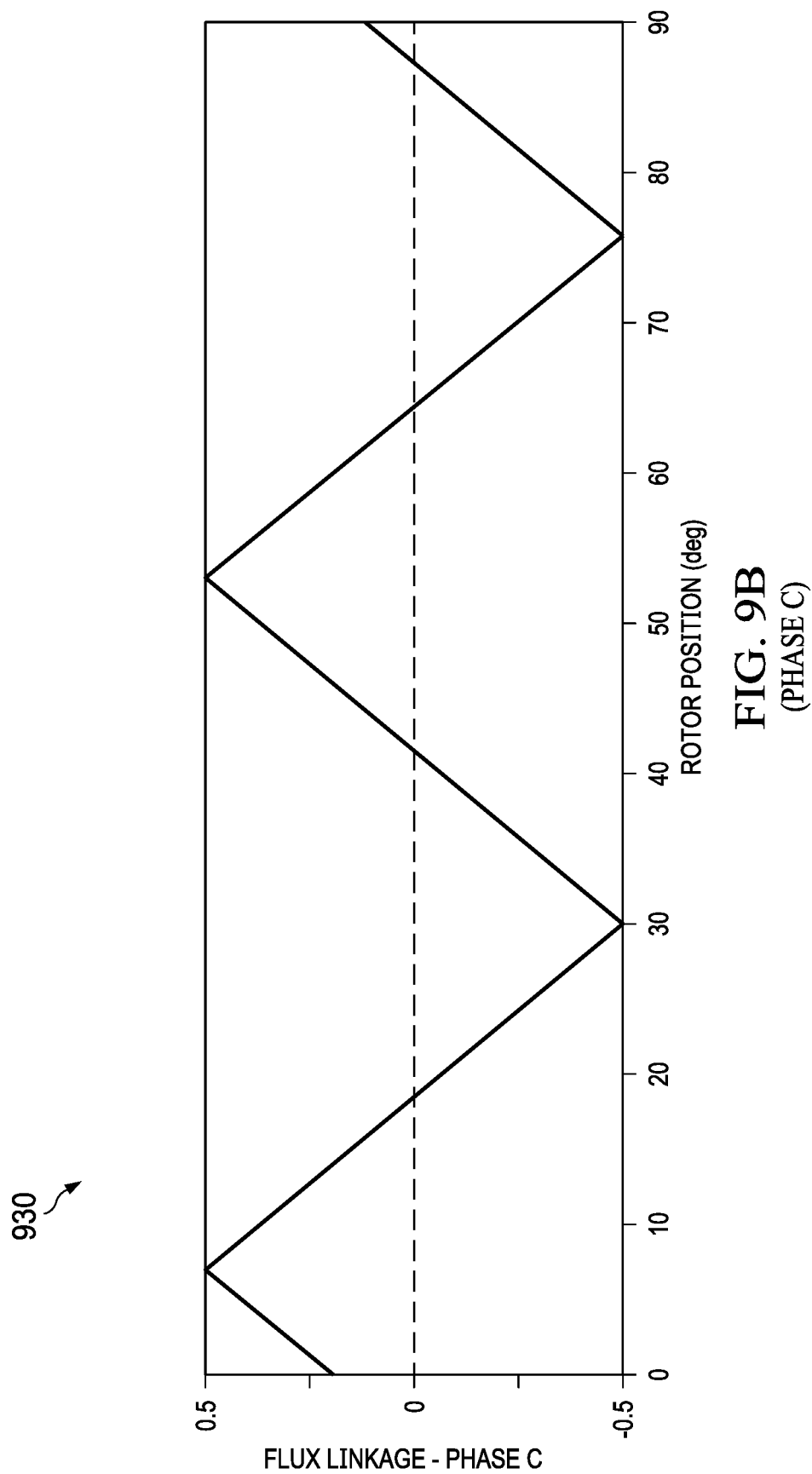
FIG. 9B is a graph of flux linkage of phase C versus rotor position for two electrical cycles.

Referring to FIG. 9B, the flux linkage for phase C as a function of rotor position in degrees is shown in chart 930. The flux linkage for phase C is shifted by about 15 degrees and about 30 degrees as compared to the flux linkages for phases A and B, respectively.

Figure 9C:
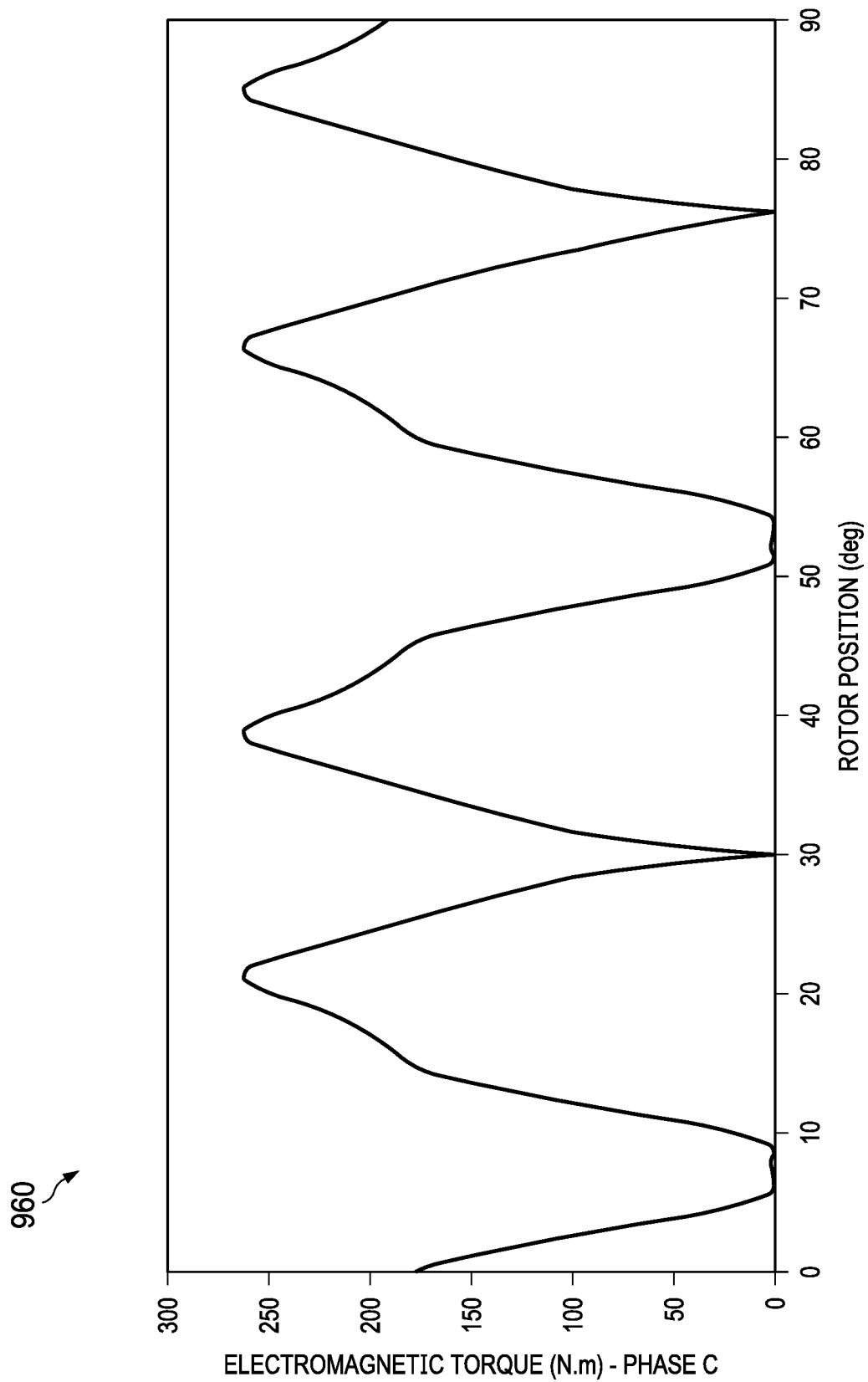
FIG. 9C is a graph of electromagnetic torque of phase C versus rotor position for two electrical cycles.

Referring to FIG. 9C, chart 960 shows the torque provided by phase C, which is shifted from the torque provided by phase A by about 30 degrees and the torque provided by phase B by about 15 degrees.

As can be seen, the curve demonstrates the same characteristic features as those described with respect phase B, shown in FIG. 8C but simply is shifted by 15 degrees rotor position.

Figure 10:
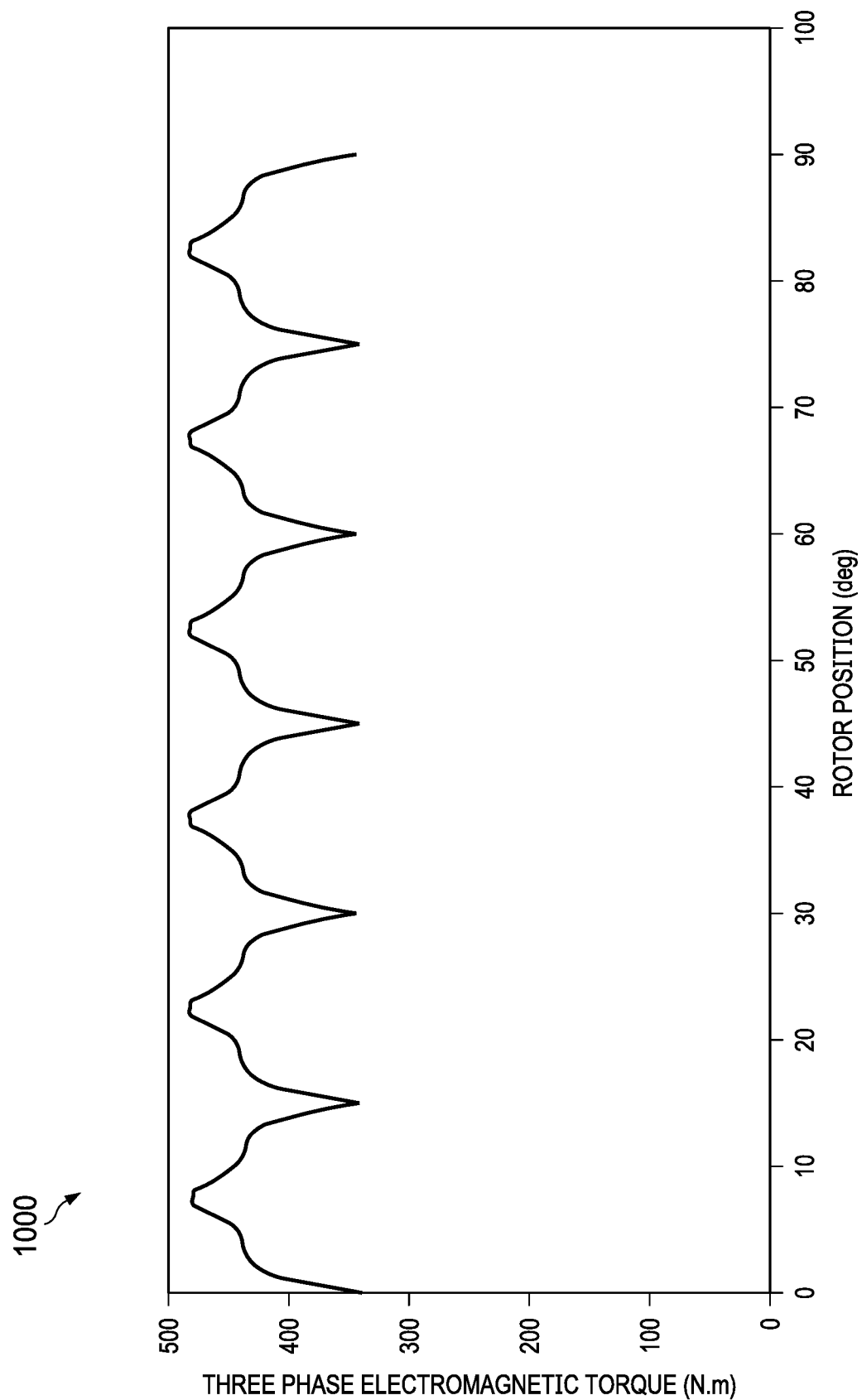
FIG. 10 is a graph of three phase electromagnetic torque versus rotor position.

Referring to FIG. 10, chart 1000 shows the electromagnetic torque provided to rotor 400 from a combination of all three phases A, B, and C. Using the voltage profiles shown in charts 700, 800, and 900, positive torque fluctuating between about 360 to 500 Nm is continuously applied to rotor 400.

As shown in FIG. 10, the torque curve demonstrates a repeating pattern six times between about 0 degrees and about 90 degrees rotor position. As an example, between about 0 degrees and about 15 degrees, the torque rises from about 350 Nm to about 425 Nm where it plateaus. The plateau extends between about 5 degrees and about 6 degrees at approximately 440 Nm. The curve then increases to a maximum of about 475 Nm at around 7.5 degrees rotor position. Between about 7.5 degrees and about 10 degrees, the curve declines reaching a plateau at around 475 Nm between about 10 degrees and 12.5 degrees rotor position. The curve then falls off between 12.5 degrees and 15 degrees rotor position, returning to a minimum of about 415 Nm. This pattern is reproduced exactly six times, in the ranges of 0-15 degrees, 15-30 degrees, 30-45 degrees, 45-60 degrees, 60-75 degrees and 75-90 degrees, and likewise repeated every 90 degrees thereafter.

Figure 11:
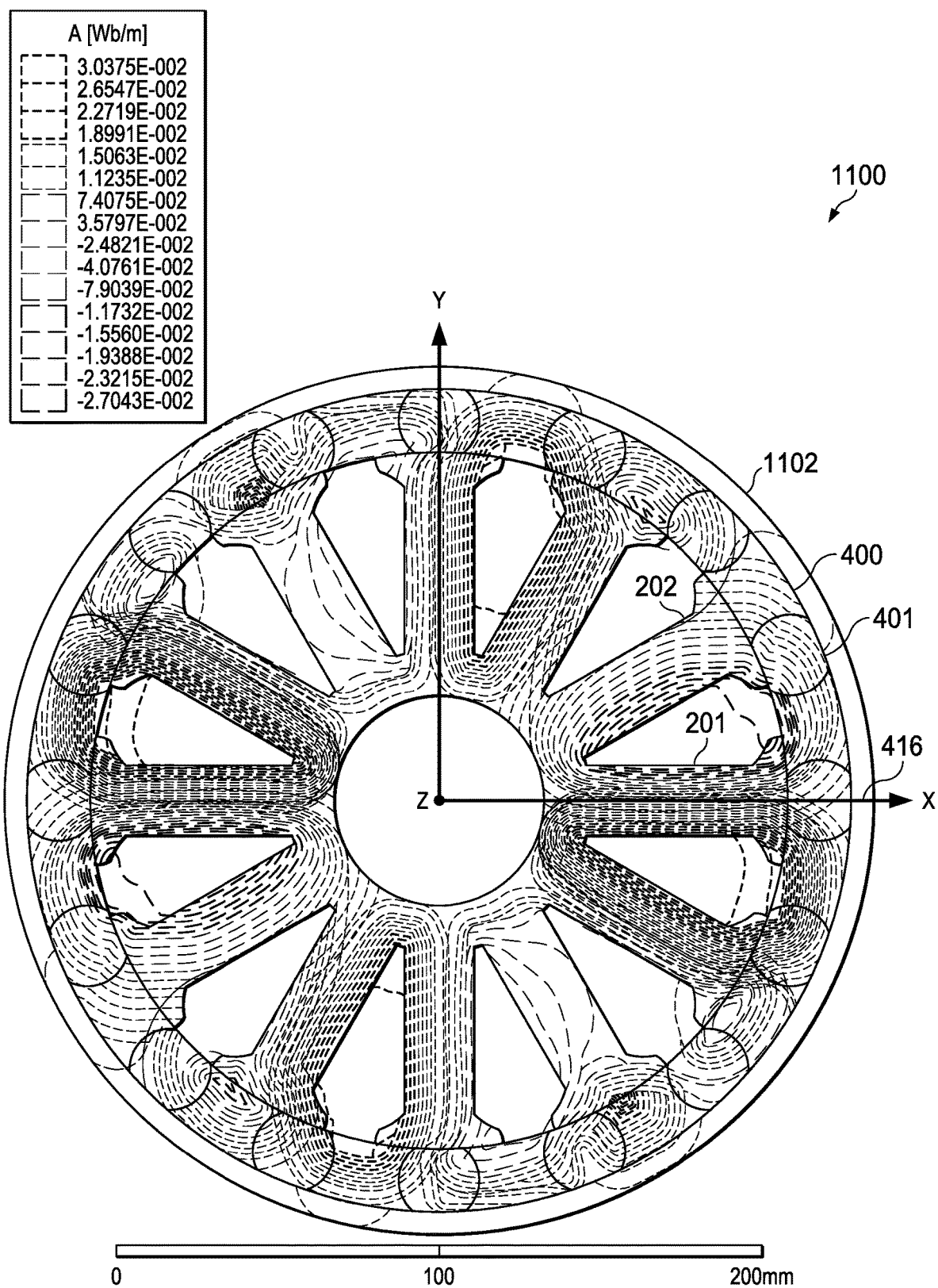
FIG. 11 is a diagram of the present invention showing flux lines when the rotor angle is 20 degrees.

Referring to FIG. 11, cross section 1100 of device 100 is overlaid with an image of the magnetic flux lines generated by device 100. Rotor 400 is rotated 20 degrees. Steel segment 401 is nearest to pole 202 and is about 10 degrees away from the center of pole 202. Steel segment 416 is about 2.5 degrees from being centered with pole 201. Surrounding rotor 400 is cylindrical shell 1102, which in a preferred embodiment forms part of rotor 400 and is made of steel.

Figure 12:
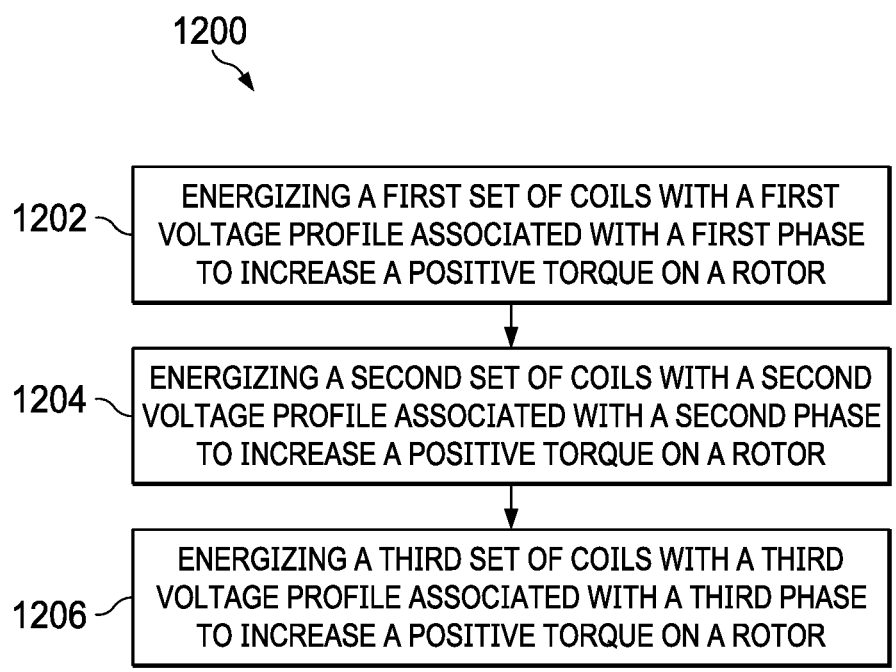
FIG. 12 is a block diagram of a method for converting between electricity and torque.

Referring to FIG. 12, method 1200 converts between electricity and torque with an electromechanical device, such as device 100.

At step 1200, a first set of coils is energized with a first voltage profile associated with a first phase to increase positive torque on rotor 400. In a preferred embodiment, the first voltage profile is the voltage profile of chart 700 of FIG. 7 and the first set of coils includes coils 314 and 317. The voltage profile includes a positive voltage for substantially 22.5 degrees of rotor rotation followed by a negative voltage for substantially 22.5 degrees of rotor rotation.

At step 1204, a second set of coils is energized with a second voltage profile associated with a second phase to increase positive torque on rotor 400. In a preferred embodiment, the second voltage profile is the voltage profile of chart 800 of FIG. 8 and the second set of coils includes coils 315 and 318. The second voltage profile is shifted from the first voltage profile by about 15 degrees of rotor rotation.

At step 1206, a third set of coils is energized with a third voltage profile associated with a third phase to increase positive torque rotor 400. In a preferred embodiment, the third voltage profile is the voltage profile of chart 900 of FIG. 9 and the third set of coils includes coils 316 and 319. The third voltage profile is shifted from the second voltage profile by about 15 degrees of rotor rotation and shifted from the first voltage profile by about 30 degrees of rotor rotation.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. An electromechanical device for converting between electricity and torque comprising:
    a stator;
    a rotor;
    a set of poles of the stator;
    a first pole including a first set of windings to form a first coil associated with a first phase;
    a third pole including a second set of windings to form a second coil associated with a second phase;
    a fifth pole including a third set of windings to form a third coil associated with a third phase;
    a seventh pole including a fourth set of windings to form a fourth coil associated with the first phase;
    a ninth pole including a fifth set of windings to form a fifth coil associated with the second phase;
    an eleventh pole including a sixth set of windings to form a sixth coil associated with the third phase;
    a set of pole pairs of the rotor;
    each pole pair including a first magnet and a second magnet;
    each first magnet having a magnetic field pointing in a clockwise direction;
    each second magnet having a magnetic field pointing in a counterclockwise direction;
    each first magnet and each second magnet including a first set of curved surfaces;
    the first set of curved surfaces of each first magnet and each second magnet including a first inner concave curved surface, a first outer convex curved surface, a first magnet concave surface, and a second magnet concave surface;

each pole pair including a metal segment juxtaposed between the first magnet and the second magnet;

each metal segment including a second set of curved surfaces;

the second set of curved surfaces of each metal segment including a second inner concave curved surface, a second outer convex curved surface, a first metal convex surface, and a second metal convex surface; and, wherein a positive torque on the rotor is increased by energizing the first coil with a first voltage profile associated with the first phase, the first voltage profile including a positive voltage followed by a negative voltage.

2. The electromechanical device of claim 1, wherein the set of poles includes twelve poles.

3. The electromechanical device of claim 2, wherein the set of pole pairs includes eight pole pairs.

4. The electromechanical device of claim 3, wherein the positive torque on the rotor is increased by energizing the first coil and the fourth coil with the first voltage profile associated with the first phase, the first voltage profile including a positive voltage for substantially 22.5 degrees of rotor rotation followed by a negative voltage for substantially 22.5 degrees of rotor rotation.

5. The electromechanical device of claim 4, wherein the positive torque on the rotor is increased by energizing the second coil and the fifth coil with a second voltage profile associated with the second phase, the second voltage profile shifted from the first voltage profile by substantially 15 degrees of rotor rotation.

6. The electromechanical device of claim 5, wherein the positive torque on the rotor is increased by energizing the third coil and the sixth coil with a third voltage profile associated with the third phase, the third voltage profile shifted from the second voltage profile by substantially 15 degrees of rotor rotation and shifted from the first voltage profile by substantially 30 degrees of rotor rotation.

7. A method of an electromechanical device for converting between electricity and torque comprising:

energizing a first coil and a fourth coil with a first voltage profile associated with a first phase to increase a positive torque on a rotor, the first voltage profile including a positive voltage for substantially 22.5 degrees of rotor rotation followed by a negative voltage for substantially 22.5 degrees of rotor rotation;

energizing a second coil with a second voltage profile associated with a second phase to increase the positive torque on the rotor, the second voltage profile shifted from the first voltage profile; and, energizing a third coil with a third voltage profile associated with a third phase to increase the positive torque on the rotor, the third voltage profile shifted from the second voltage profile and shifted from the first voltage profile.

8. The method of claim 7, further comprising:

energizing the second coil and a fifth coil with the second voltage profile associated with the second phase to increase the positive torque on the rotor, the second voltage profile shifted from the first voltage profile by substantially 15 degrees of rotor rotation; and, energizing the third coil and a sixth coil with the third voltage profile associated with the third phase to increase the positive torque on the rotor, the third voltage profile shifted from the second voltage profile by substantially 15 degrees of rotor rotation and shifted from the first voltage profile by substantially 30 degrees of rotor rotation.

* * * * *

UNITED STATES PATENT AND TRADEMARK OFFICE
CERTIFICATE OF CORRECTION

PATENT NO. : 10,903,771 B2
APPLICATION NO. : 16/352679
DATED : January 26, 2021
INVENTOR(S) : Amir Parsapour, Mehdi Moallem and Babak Fahimi It is certified that error appears in the above-identified patent and that said Letters Patent is hereby corrected as shown below:

On the Title Page

Column 1, Item (73) Assignee:
Change "Regente" to --Regents--

Signed and Sealed this
Sixth Day of September, 2022

Katherine Kelly Vidal
*Director of the United States Patent and Trademark Office*